US012609575B2

(12) United States Patent
Kamada

(10) Patent No.: US 12,609,575 B2
(45) Date of Patent: Apr. 21, 2026

(54) STATOR WITH CORE HAVING BUSBARS HAVING INTEGRALLY MOLDED INSULATING RESIN

(71) Applicant: Panasonic Intellectual Property Management Co., Ltd., Osaka (JP)

(72) Inventor: Yasushi Kamada, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 205 days.

(21) Appl. No.: 18/560,423

(22) PCT Filed: Apr. 25, 2022

(86) PCT No.: PCT/JP2022/018661
§ 371 (c)(1),
(2) Date: Nov. 13, 2023

(87) PCT Pub. No.: WO2022/249828
PCT Pub. Date: Dec. 1, 2022

(65) Prior Publication Data
US 2024/0275229 A1      Aug. 15, 2024

(30) Foreign Application Priority Data

May 28, 2021      (JP) ................................. 2021-090555

(51) Int. Cl.
*H02K 3/52* (2006.01)
*H02K 3/38* (2006.01)
(Continued)

(52) U.S. Cl.
CPC ............... *H02K 3/522* (2013.01); *H02K 3/38* (2013.01); *H02K 15/105* (2013.01); *H02K 15/12* (2013.01); *H02K 2203/09* (2013.01)

(58) Field of Classification Search
CPC ........ H02K 3/38; H02K 3/40; H02K 2203/09; H02K 1/04; H02K 1/20; H02K 9/19; H02K 15/12
(Continued)

(56) References Cited

U.S. PATENT DOCUMENTS 4,272,646 A * 6/1981 Carlson .................. H02G 5/007
174/88 B
6,462,453 B1 * 10/2002 Asao ........................ H02K 3/28
310/260
(Continued)

FOREIGN PATENT DOCUMENTS

JP        09-149569        6/1997
JP        10-234153        9/1998
(Continued)

OTHER PUBLICATIONS

Thermosetting Plastic, https://behinpolymerco.com/en/thermosetting-plastics/.*
(Continued)

*Primary Examiner* — Maged M Almawri
(74) *Attorney, Agent, or Firm* — Rimon P.C.

(57) ABSTRACT

A stator includes a core, a plurality of molded coils, a bus bar, and an insulating resin. The core includes a yoke and a plurality of teeth. The plurality of teeth protrude from an inner peripheral surface of the yoke. The plurality of molded coils are arranged on the plurality of teeth. The bus bar is connected to the plurality of molded coils and can be connected to an external circuit. The insulating resin has insulation properties. The insulating resin includes a first resin portion, a second resin portion, and a third resin portion. The first resin portion molds the bus bar. The second resin portion is arranged between the plurality of teeth and the plurality of molded coils. The third resin portion molds the plurality of molded coils. The first resin portion, the
(Continued)

second resin portion, and the third resin portion are integrally molded.

5 Claims, 19 Drawing Sheets

(51) Int. Cl.
H02K 15/10          (2006.01)
H02K 15/12          (2006.01)
(58) Field of Classification Search
USPC .............................. 310/43, 201, 196, 194, 71
See application file for complete search history.

(56)                    References Cited

U.S. PATENT DOCUMENTS

| 6,600,244 | B2 * | 7/2003 | Okazaki ................. | H02K 3/522 |
| | | | | 310/71 |
| 7,514,829 | B2 * | 4/2009 | Otsuji ................. | H01R 25/161 |
| | | | | 310/71 |
| 8,278,795 | B2 * | 10/2012 | Emery ..................... | H02K 3/40 |
| | | | | 310/201 |
| 9,634,533 | B2 * | 4/2017 | Uchitani ............... | H02K 3/522 |
| 9,653,956 | B2 * | 5/2017 | Taniguchi ................ | H02K 3/28 |
| 10,063,117 | B2 * | 8/2018 | Nakayama ............... | H02K 3/28 |
| 10,305,339 | B2 * | 5/2019 | Awazu ..................... | H02K 3/12 |
| 2003/0173842 | A1 * | 9/2003 | Kobayashi ............. | H02K 15/10 |
| | | | | 310/71 |
| 2007/0232094 | A1 * | 10/2007 | Hoshika ................. | H02K 3/522 |
| | | | | 439/76.2 |
| 2009/0069483 | A1 * | 3/2009 | Komatsu .................. | C08K 7/08 |
| | | | | 524/430 |
| 2010/0141078 | A1 * | 6/2010 | Kouda ..................... | H02K 3/12 |
| | | | | 310/195 |
| 2010/0148615 | A1 * | 6/2010 | Sasaki ................... | H02K 3/522 |
| | | | | 310/180 |
| 2011/0018376 | A1 * | 1/2011 | Kataoka ................. | H02K 3/522 |
| | | | | 310/71 |
| 2011/0187226 | A1 * | 8/2011 | Sagara ................... | H02K 3/522 |
| | | | | 310/254.1 |
| 2012/0056500 | A1 * | 3/2012 | Nakanishi .............. | H02K 15/35 |
| | | | | 310/71 |
| 2012/0319507 | A1 * | 12/2012 | Ueno ..................... | H02K 3/345 |
| | | | | 310/43 |
| 2013/0062973 | A1 * | 3/2013 | Yoshimura ........... | H02K 15/022 |
| | | | | 156/60 |
| 2013/0069461 | A1 * | 3/2013 | Arai ........................ | H02K 3/522 |
| | | | | 310/71 |
| 2013/0127289 | A1 * | 5/2013 | Koga ........................ | H01F 5/00 |
| | | | | 174/113 R |
| 2013/0127290 | A1 * | 5/2013 | Matsubara ............... | H02K 3/38 |
| | | | | 310/208 |
| 2013/0221790 | A1 * | 8/2013 | Reid ........................ | H02K 3/40 |
| | | | | 310/196 |
| 2014/0125182 | A1 * | 5/2014 | Takahashi .............. | H02K 1/276 |
| | | | | 310/156.11 |
| 2014/0375156 | A1 * | 12/2014 | Sugiura .................... | H02K 3/28 |
| | | | | 310/71 |
| 2015/0022045 | A1 * | 1/2015 | Hagiwara ................ | H02K 3/38 |
| | | | | 310/201 |
| 2015/0097453 | A1 * | 4/2015 | Nishikawa ............... | H02K 3/50 |
| | | | | 310/71 |
| 2015/0162796 | A1 * | 6/2015 | Okamoto ................. | H02K 3/28 |
| | | | | 310/71 |
| 2015/0171689 | A1 * | 6/2015 | Wada ..................... | H02K 5/203 |
| | | | | 310/43 |
| 2016/0020658 | A1 * | 1/2016 | Tamura .................... | H02K 3/28 |
| | | | | 310/71 |
| 2017/0033630 | A1 * | 2/2017 | Tamura .................... | H02K 3/18 |
| 2018/0287445 | A1 * | 10/2018 | Ishizuka .................. | H02K 1/16 |
| 2020/0028400 | A1 * | 1/2020 | Seo ........................ | H02K 15/10 |
| 2020/0059129 | A1 * | 2/2020 | Yamashita ............. | H02K 3/522 |

FOREIGN PATENT DOCUMENTS

| JP | 2009-195029 | 8/2009 |
| JP | 2009-261086 | 11/2009 |
| JP | 2010-063323 | 3/2010 |
| JP | 2011-259566 | 12/2011 |
| JP | 2015-076982 A | 4/2015 |
| JP | 2018-007519 | 1/2018 |
| WO | 2009/113520 | 9/2009 |
| WO | 2018/181927 | 10/2018 |

OTHER PUBLICATIONS

International Search Report of PCT application No. PCT/JP2022/018661 dated Jun. 28, 2022.
The EPC Office Action dated Sep. 30, 2024 for the related European Patent Application No. 22811102.7.

* cited by examiner

STATOR WITH CORE HAVING BUSBARS HAVING INTEGRALLY MOLDED INSULATING RESIN

CROSS-REFERENCE TO RELATED APPLICATIONS

This application is a U.S. national stage application of the PCT International Application No. PCT/JP2022/018661 filed on Apr. 25, 2022, which claims the benefit of foreign priority of Japanese patent application 2021-090555 filed on May 28, 2021, the contents all of which are incorporated herein by reference.

TECHNICAL FIELD

The present disclosure relates to a stator and a stator manufacturing method. More specifically, the present disclosure relates to a stator having an insulating resin obtained by molding a plurality of molded coils and a bus bar, and a stator manufacturing method for manufacturing the stator.

BACKGROUND ART

An armature (a stator) described in PTL 1 includes a core, a wound coil (a molded coil) wound around the core, an insulator arranged between the core and the wound coil to insulate the core and the wound coil, and a bus bar connecting the wound coil and an external circuit. The core and the bus bar are resin-molded with the insulator. The wound coil is wound around the core with the insulator interposed therebetween. In other words, in PTL 1, the resin for molding the bus bar and the insulator are integrally formed.

In the armature described in PTL 1, the wound coil and the bus bar are not fixed to each other by resin molding. For this reason, when the armature is subjected to vibration from the outside, the wound coil and the bus bar may move individually and a connection part between the wound coil and the bus bar may break. In other words, reliability of the connection part between the wound coil and the bus bar is low against external vibration. For this reason, it is desirable that the wound coil and the bus bar are fixed to each other by resin molding.

However, when the wound coil and the bus bar are fixed to each other by resin molding as described above, the resin molding is performed twice in combination with resin molding for forming the insulator, and a manufacturing process is increased (that is, cost is increased).

CITATION LIST

Patent Literature

PTL 1: Unexamined Japanese Patent Publication No. 2009-195029

SUMMARY

An object of the present disclosure is in view of the above circumstances. An object of the present disclosure is to provide a stator and a stator manufacturing method that can improve reliability of a connection part between a molded coil and a bus bar against external vibration and suppressing an increase in cost.

A stator according to one aspect of the present disclosure includes a core, a plurality of molded coils, a bus bar, and an insulating resin. The core includes a yoke having a tubular shape and a plurality of teeth that protrude from an inner peripheral surface of the yoke to inside of the yoke. The plurality of molded coils are arranged on the plurality of teeth. The bus bar is electrically connected to the plurality of molded coils and can be electrically connected to an external circuit. The insulating resin has insulation properties. The insulating resin includes a first resin portion, a second resin portion, and a third resin portion. The first resin portion molds the bus bar. The second resin portion is arranged between the plurality of teeth and the plurality of molded coils. The third resin portion molds the plurality of molded coils. The first resin portion, the second resin portion, and the third resin portion are integrally molded.

The first resin portion, the second resin portion, and the third resin portion may be made of same resin material.

The insulating resin may not include boundary surfaces that divide the first resin portion, the second resin portion, and the third resin portion.

The core, the plurality of molded coils, the bus bar, and the insulating resin may be integrated by insert molding.

A stator manufacturing method according to another aspect of the present disclosure includes a first step, a second step, a third step, a fourth step, and a fifth step. In the first step, a yoke having a tubular shape and a plurality of teeth to be assembled to the inner peripheral surface of the yoke are prepared. In the second step, a plurality of molded coils and a bus bar are prepared, and the plurality of molded coils and the bus bar are positioned and interconnected in a predetermined relative arrangement to assemble a connector. In the third step, the plurality of teeth are inserted into the plurality of molded coils constituting the connector, and in a state where a relative arrangement between the connector and the plurality of teeth is positioned using a jig, the plurality of teeth are assembled to the inner peripheral surface of the yoke to assemble an assembly. In the fourth step, a molding mold is prepared, and in the assembly, a mold assembly is assembled by assembling the molding mold to the yoke instead of the jig in a state where the relative arrangement of the plurality of molded coils and the plurality of teeth is maintained. In the fifth step, in the mold assembly, molten resin is poured into an internal space surrounded by the yoke, the plurality of teeth, and the molding mold, and the molding mold is removed from the yoke after the molten resin is cured.

In particular, in the fourth step, the plurality of teeth are assembled to the inner peripheral surface of the yoke and protrude from the inner peripheral surface of the yoke. The plurality of molded coils are arranged on the plurality of teeth. The bus bar is arranged on one end side of the plurality of molded coils in a central axis direction of the yoke. The molding mold is assembled on both sides of the yoke so as to block openings on both sides of the yoke. The molding mold secures a gap into which the molten resin flows between the plurality of molded coils and the plurality of teeth by positioning relative positions of the plurality of molded coils in a circumferential direction and the relative positions of the plurality of molded coils in the central axis direction relative to the yoke.

In the step of assembling the connector, a plurality of blocks that correspond to the plurality of molded coils and hold the corresponding molded coils are prepared, at least one of the plurality of blocks further holds a portion of the bus bar arranged on one end side of the corresponding molded coil, and the connector may be assembled by connecting the plurality of molded coils and the bus bar to each other in a state where the plurality of molded coils and the bus bar are positioned by the plurality of blocks in a predetermined relative arrangement.

In the step of assembling the assembly, the jig includes a center core jig and a holding jig; the center core jig is inserted into a central hole of the connector in a state where the plurality of teeth are inserted into the plurality of molded coils, and positions the positions of the plurality of molded coils in the circumferential direction relative to the center core jig; the holding jig is assembled to one end side of the connector in a state where the plurality of teeth are inserted into the plurality of molded coils, and positions the relative arrangement of the plurality of molded coils and the plurality of teeth in the circumferential direction of the center core jig; and an intermediate assembly may be formed by positioning and assembling the connector and the plurality of teeth in a predetermined relative arrangement using the center core jig and the holding jig, and by inserting the intermediate assembly into the central hole of the yoke, the plurality of molded coils of the intermediate assembly may be assembled on the inner peripheral surface of the yoke to assemble the assembly.

In the step of assembling the mold assembly, the molding mold may include a first mold and a second mold, the first mold may include the center core jig and an outer peripheral mold; in the assembly, the second mold may be assembled to an opening on one end side of the yoke instead of the holding jig, the outer peripheral mold may be assembled to an opening on a side opposite to the side of the second mold in the yoke; and the second mold and the outer peripheral mold may position the relative positions of the plurality of molded coils in the circumferential direction relative to the yoke and position the relative positions of the plurality of molded coils in the central axis direction relative to the yoke, respectively.

According to the present disclosure, there is an effect that the reliability of the connection part between the molded coil and the bus bar against external vibration can be improved and an increase in cost can be suppressed.

DESCRIPTION OF PREFERRED EMBODIMENTS

Exemplary Embodiment (1) Configuration of Stator

Stator 1 according to the present exemplary embodiment will be described in detail with reference to the drawings. The configuration described in the present exemplary embodiment is merely an example of the present disclosure. The present disclosure is not limited to the present exemplary embodiment, and various modifications can be made according to design and the like without departing from the technical idea according to the present disclosure.

Stator 1 according to the present exemplary embodiment can be used as, for example, a stator of a motor that can be used in a vehicle (for example, an automobile). More specifically, stator 1 constitutes a motor together with a rotor arranged concentrically and rotatably inside stator 1.

Figure 1:
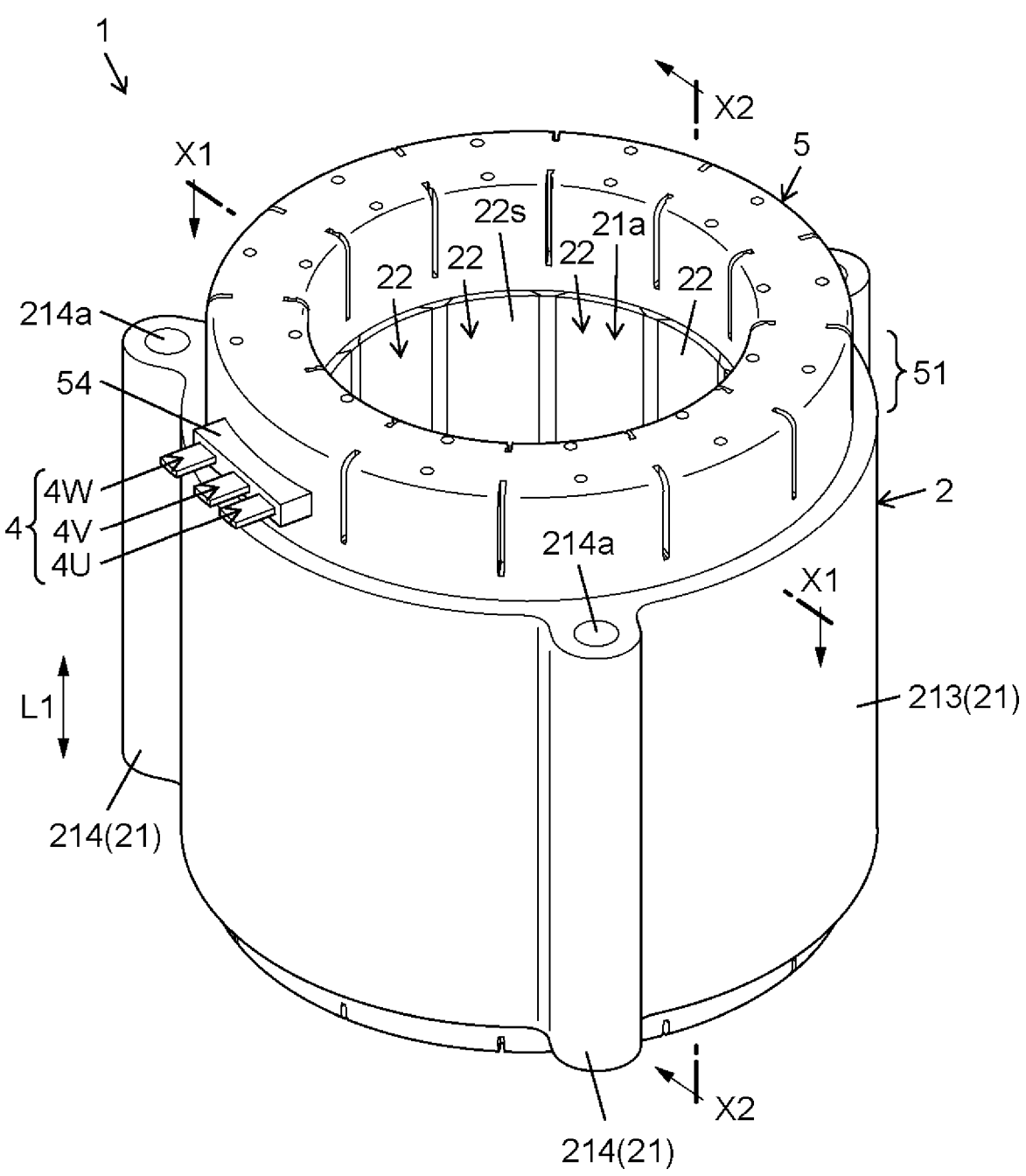
FIG. 1 is a perspective view of a stator according to an exemplary embodiment.
Figure 2:
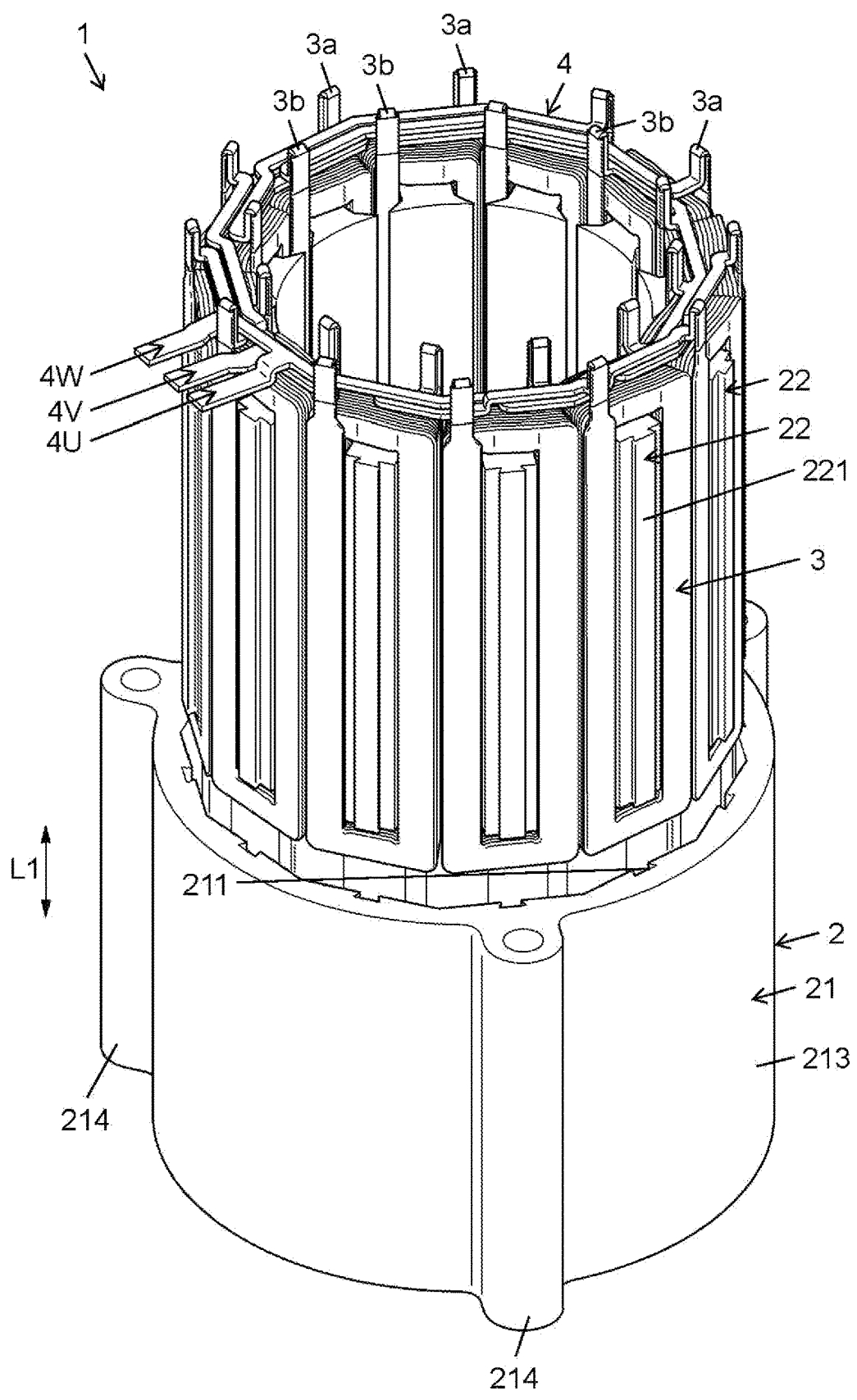
FIG. 2 is a partially exploded perspective view of the stator described above in which an insulating resin is seen through and a portion other than the insulating resin is partially disassembled.

FIG. 1 is a perspective view of stator 1 according to an exemplary embodiment. FIG. 2 is a partially exploded perspective view of stator 1 described above in which an insulating resin is seen through and a portion other than the insulating resin is partially disassembled. As shown in FIGS. 1 and 2, stator 1 includes core 2, a plurality of molded coils 3, bus bar 4, and insulating resin 5.

(1-1) Core

Figure 5:
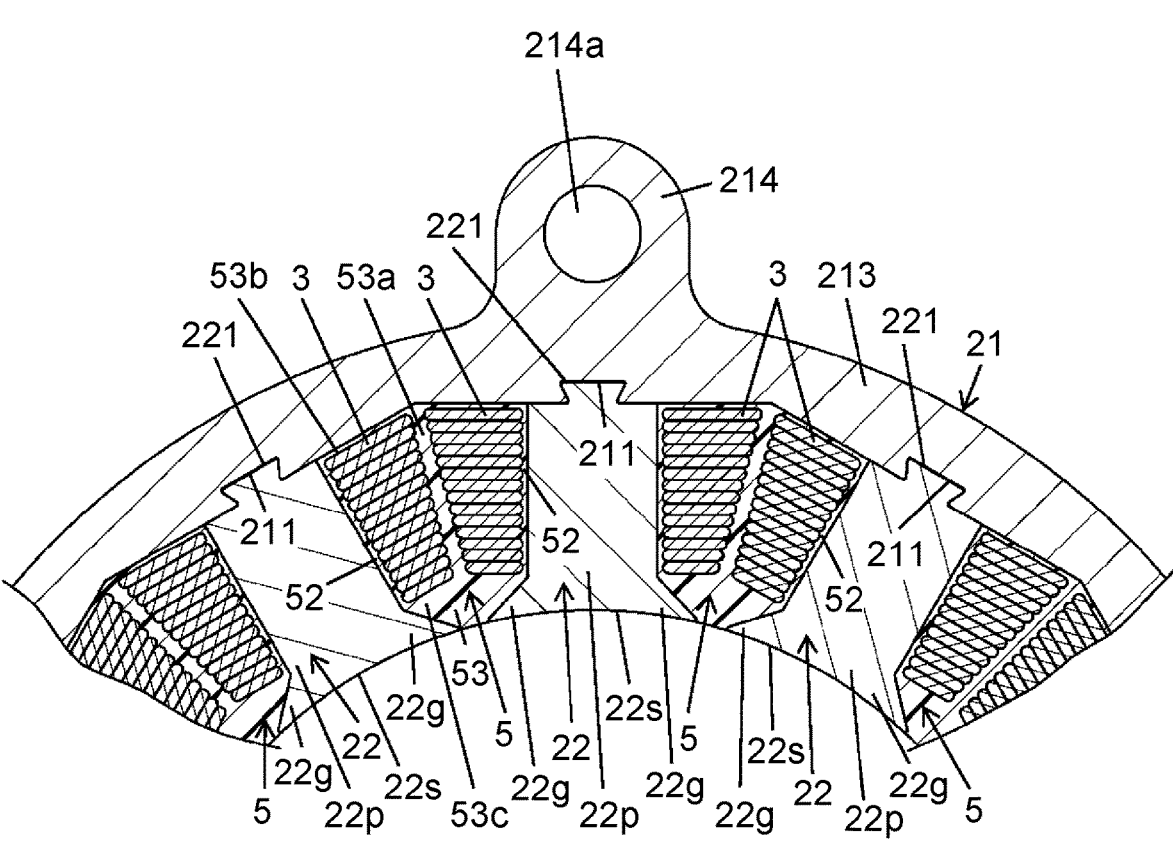
FIG. 5 is a partially enlarged view of a cross section taken along an X1-X1 line in FIG. 1.

FIG. 5 is a partially enlarged view of a cross section taken along an X1-X1 line in FIG. 1. As shown in FIGS. 1, 2, and 5, core 2 is a member constituting a magnetic path through which a magnetic flux generated in each of the plurality of molded coils 3 passes. Core 2 is made of metal (for example, ferromagnetic metal such as iron). Core 2 includes yoke (also referred to as an O-shaped core) 21 and a plurality of teeth (also referred to as an I-shaped core) 22.

Yoke 21 is a portion that supports the plurality of teeth 22. Yoke 21 has, for example, a cylindrical shape. Yoke 21 has central hole 21a with a circular shape. Central hole 21a penetrates a center (center C1) of yoke 21 in a direction of central axis L1 of yoke 21. Yoke 21 has openings at both ends in the direction of central axis L1. In the following description, central axis L1 is a central axis passing through center C1 of yoke 21 (see FIG. 4).

Yoke 21 includes yoke body 213 and a plurality of (for example, three) connection portions 214. Central axis L1 is a central axis of both yoke 21 and yoke body 213. Yoke body 213 has a cylindrical shape having central hole 21a. Yoke body 213 has openings at both end portions in the direction of central axis L1 of yoke body 213. The plurality of connection portions 214 are portions connected to a molding mold for forming insulating resin 5. Connection portion 214 has a substantially cylindrical shape. The plurality of connection portions 214 are provided along the direction of central axis L1 on an outer peripheral surface of yoke body 213, and are arranged at equal intervals in the circumferential direction on the outer peripheral surface of yoke body 213. Connection portion 214 is provided with fitting hole 214a that penetrates between an upper surface and a lower surface of connection portion 214. A fitting projection of the molding mold can be fitted into fitting hole 214a formed in connection portion 214.

The plurality of (for example, 12) teeth 22 are portions where the plurality of (for example, 12) molded coils 3 are wound (in other words, arranged). Tooth 22 is provided on an inner peripheral surface of yoke 21, and protrudes from the inner peripheral surface of yoke 21 to the inside of yoke 21. Tooth 22 has a substantially T-shape in plan view seen from the direction of central axis L1. More specifically, tooth 22 include tooth body 22p and a pair of projecting portions 22g (see FIG. 5). Tooth body 22p has a rectangular parallelepiped shape. Tooth body 22p protrudes from the inner peripheral surface of yoke 21 to the inside of yoke 21. The pair of projecting portions 22g projects toward both sides in the circumferential direction of yoke 21 at a distal end portion of tooth body 22p. Projecting portion 22g has a triangular shape in plan view. The plurality of teeth 22 are arranged at equal intervals along the circumferential direction of yoke 21 on the inner peripheral surface of yoke 21. The plurality of teeth 22 are formed from one end to the other end of yoke 21 in the direction of central axis L1.

Yoke 21 and the plurality of teeth 22 are fitted and assembled to each other. More specifically, a plurality of fitting grooves 211 are provided on the inner peripheral surface of yoke 21. The plurality of fitting grooves 211 correspond one-to-one with the plurality of teeth 22, and are portions where fitting protrusions 221 to be described later of corresponding teeth 22 are fitted. A cross-sectional shape of fitting groove 211 is a trapezoid. In other words, a width of fitting groove 211 (a width of yoke 21 in the circumferential direction) becomes narrower from a bottom surface side of fitting groove 211 toward an opening surface side on the opposite side. Fitting groove 211 is provided from one end to the other end of yoke 21 in the direction of central axis L1. Both end portions of fitting groove 211 in the direction of central axis L1 are opened at both end portions of yoke 21 in the direction of central axis L1. The plurality of fitting grooves 211 are arranged at equal intervals in the circumferential direction of yoke 21 on the inner peripheral surface of yoke 21.

Fitting protrusion 221 is provided on a proximal end surface of tooth 22 (that is, an end surface opposite to a protruding direction of tooth 22). Fitting protrusion 221 is a portion that fits into fitting groove 211 of yoke 21. The cross-sectional shape of fitting protrusion 221 is an inverted trapezoid. In other words, the width (the width in the circumferential direction of yoke 21) of fitting protrusion 221 becomes wider from a proximal end side to a distal end side of fitting protrusion 221. Fitting protrusion 221 is provided from one end to the other end in a longitudinal direction of tooth 22 (that is, the direction of central axis L1 of yoke 21) on the proximal end surface of tooth 22.

Tooth 22 is assembled to yoke 21 by fitting fitting protrusion 221 of tooth 22 into fitting groove 211 of yoke 21. Fitting protrusion 221 of tooth 22 is inserted into fitting groove 211 along the direction of central axis L1 from one end opening of fitting groove 211 of yoke 21 in the direction of central axis L1 (see FIG. 2). As a result, fitting protrusion 221 is fitted into fitting groove 211.

(1-2) Molded Coil

Figure 3:
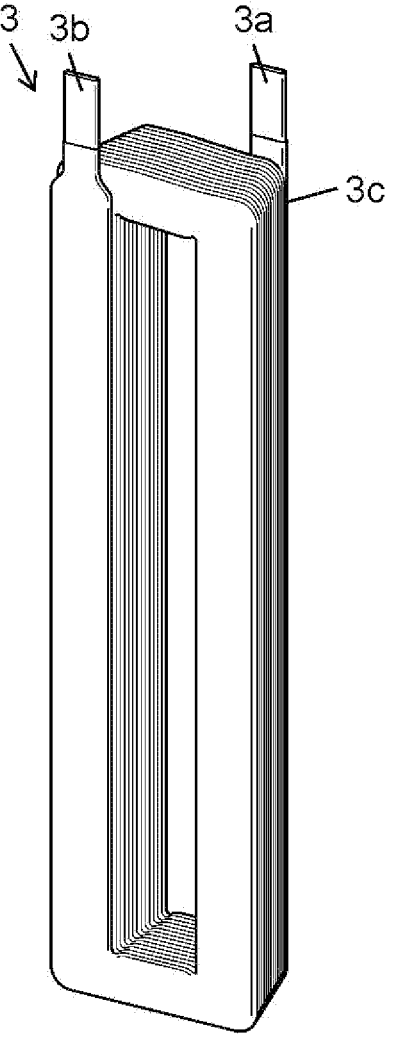
FIG. 3 is a perspective view of a molded coil of the stator described above.

FIG. 3 is a perspective view of molded coil 3 of stator 1 according to the exemplary embodiment. As shown in FIGS. 2 and 3, the plurality of molded coils 3 are members that generate a magnetic flux when a current from the outside is applied. The plurality of molded coils 3 are wound (that is, arranged) around corresponding teeth 22 among the plurality of teeth 22 of core 2. Molded coil 3 is a coil in which each winding portion is laminated while winding conductor 3c having an elongated plate shape (see FIG. 3). By using molded coil 3, dimensions of an outer diameter and an inner diameter of molded coil 3 can be accurately formed, and a space factor (a ratio of the conductor to the cross section of the coil) can be increased. Molded coil 3 is formed in a rectangular frame shape so that it can be fitted to an outer periphery of tooth 22.

In a state where molded coil 3 is wound around tooth 22, both end portions 3a and 3b of molded coil 3 are drawn out of yoke 21 from an upper end opening (that is, an opening on the same side) of yoke 21 (see FIG. 2). Further, one end portion 3a of both end portions 3a and 3b of molded coil 3 is arranged outside yoke 21 in a radial direction in molded coil 3. Other end portion 3b is arranged inside yoke 21 in the radial direction in molded coil 3 (see FIG. 2).

(1-3) Bus Bar

Figure 4:
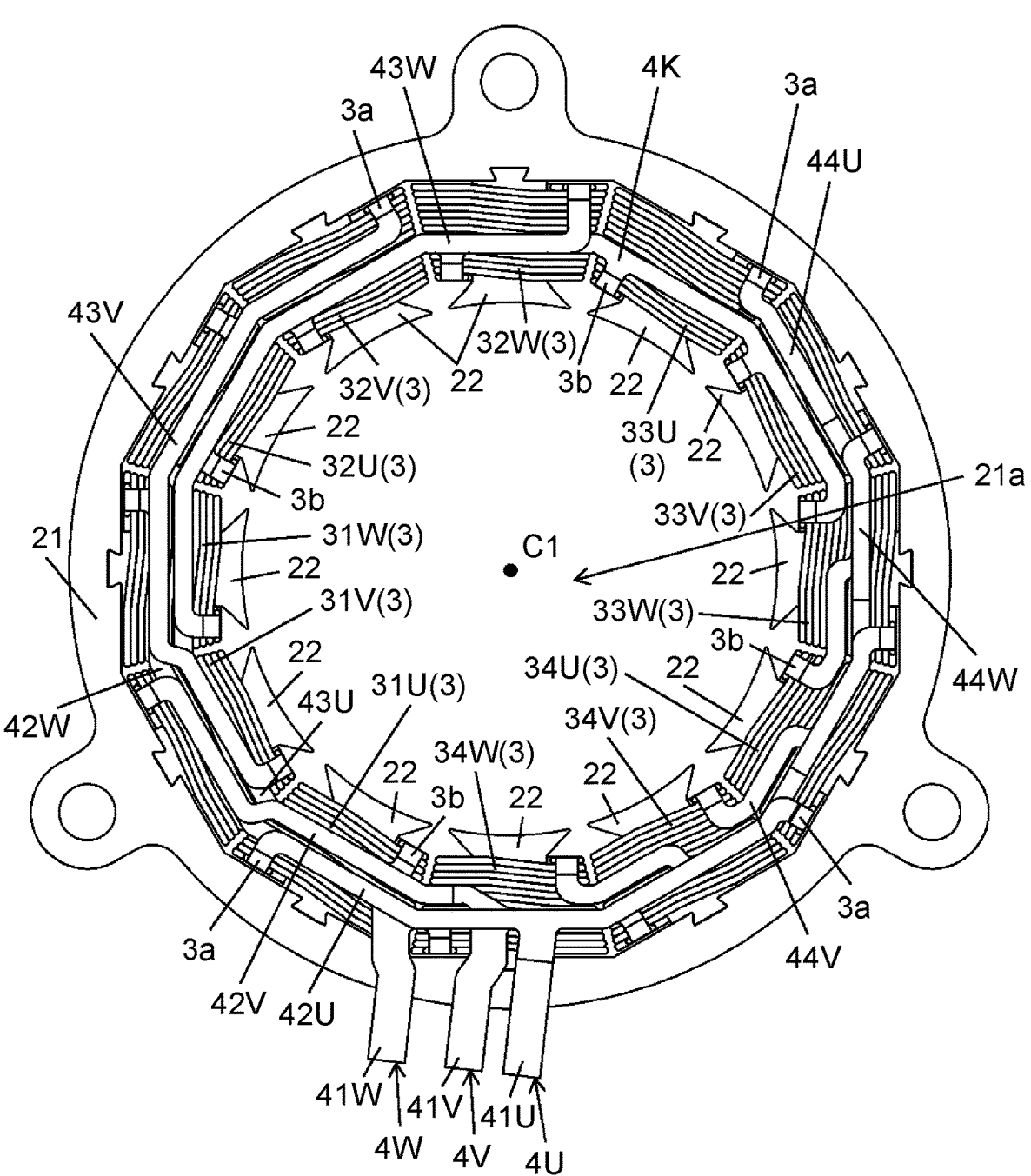
FIG. 4 is a plan view of the stator described above in which the insulating resin is seen through and a portion other than the insulating resin is viewed from an upper side (a side of a bus bar).

FIG. 4 is a plan view of stator 1 according to the exemplary embodiment in which the insulating resin is seen through and a portion other than the insulating resin is viewed from the upper side (the side of bus bar 4). As shown in FIG. 4, bus bar 4 is a conductor that connects the plurality of molded coils 3 by a predetermined connection method (for example, a star connection method) and functions as a wiring for connecting the plurality of molded coils 3 to an external circuit. Bus bar 4 is a conductor that is electrically connected to the plurality of molded coils 3 and can be electrically connected to an external circuit.

Bus bar 4 connects the plurality of molded coils 3 by, for example, a star connection method. In other words, in the present exemplary embodiment, stator 1 includes, for example, 12 molded coils 3. The 12 molded coils 3 include four U-phase coils 31U to 34U, four V-phase coils 31V to 34V, and four W-phase coils 31W to 34W. The four U-phase coils 31U, 32U, 33U, and 34U are arranged in this order, for example, every two in a clockwise direction in 12 teeth 22 disposed in a ring shape. The four V-phase coils 31V, 32V, 33V, and 34V are arranged in this order, for example, every two in the clockwise direction in the 12 teeth 22 disposed in a ring shape. The four W-phase coils 31W, 32W, 33W, and 34W are arranged in this order, for example, every two in the clockwise direction in the 12 teeth 22 disposed in a ring shape.

Then, bus bar 4 includes U-phase bus bar 4U, V-phase bus bar 4V, W-phase bus bar 4W, and neutral point bus bar 4K. U-phase bus bar 4U includes U-phase external terminal 41U and a plurality of (for example, three) U-phase conductor portions 42U to 44U. Each of U-phase conductor portions 42U to 44U and neutral point bus bar 4K is a strip-shaped rectangular conductor bent in a substantially arc shape along the circumferential direction of yoke 21. U-phase conductor portion 42U connects one end portion 3a of each of U-phase coils 31U and 33U, for example. U-phase conductor portion 43U connects other end portion 3b of U-phase coil 31U and one end portion 3a of U-phase coil 32U, for example. U-phase conductor portion 44U connects other end portion 3b of U-phase coil 34U and one end portion 3a of U-phase coil 33U, for example. Neutral point bus bar 4K connects one end portion 3b of each of U-phase coils 32U and 34U, for example. In other words, the four U-phase coils 31U to 34U are connected so as to be two in series and two in parallel by U-phase bus bar 4U and neutral point bus bar 4K.

Similarly, V-phase bus bar 4V includes V-phase external terminal 41V and a plurality of (for example, three) V-phase conductor portions 42V to 44V. The four V-phase coils 31V to 34V are connected so as to be two in series and two in parallel by V-phase bus bar 4V and neutral point bus bar 4K. Similarly, W-phase bus bar 4W includes W-phase external terminal 41W and a plurality of (for example, three) W-phase conductor portions 42W to 44W. The four W-phase coils 31W to 34W are connected so as to be two in series and two in parallel by W-phase bus bar 4W and neutral point bus bar 4K.

The three external terminals 41U, 41V, and 41W are collected and arranged at one location in the circumferential direction of yoke 21 at one end portion (that is, a circumferential end portion) in the direction of central axis L1 of yoke 21. The three external terminals 41U, 41V, and 41W are disposed side-by-side in the circumferential direction of yoke 21. The three external terminals 41U, 41V, and 41W protrude from their arrangement positions to an outer peripheral side of yoke 21.

Bus bar 4 is arranged so as to overlap the plurality of molded coils 3 when viewed from the direction of central axis L1 of yoke 21. More specifically, bus bar 4 can be arranged using at least one of upper and lower two layers (an upper layer and a lower layer) in the direction of central axis L1 of yoke 21. The lower layer is a layer on the side of molded coil 3, and the upper layer is a layer on the side opposite to the side of molded coil 3. Bus bar 4 can be arranged using at least one of inner and outer two rows (an outer row and an inner row) in the radial direction of yoke 21. In other words, bus bars 4 can be arranged within a range of two layers and two rows. As described above, bus bar 4 has a two-layer two-row arrangement structure.

Note that, bus bar 4 may be arranged through the same row and layer throughout, may be transferred between the upper layer and the lower layer in the middle, or may be transferred between the inner row and the outer row. For example, U-phase conductor portion 42U is arranged from one end portion 3a of U-phase coil 31 to one end portion 3a of U-phase coil 34U through the upper layer and the outer row. U-phase conductor portion 43U passes through the lower layer and the inner row from other end portion 3b of U-phase coil 31U, moves to the lower layer and the outer row in the middle, and is arranged up to one end portion 3a of U-phase coil 32U.

(1-4) Insulating Resin

Figure 6:
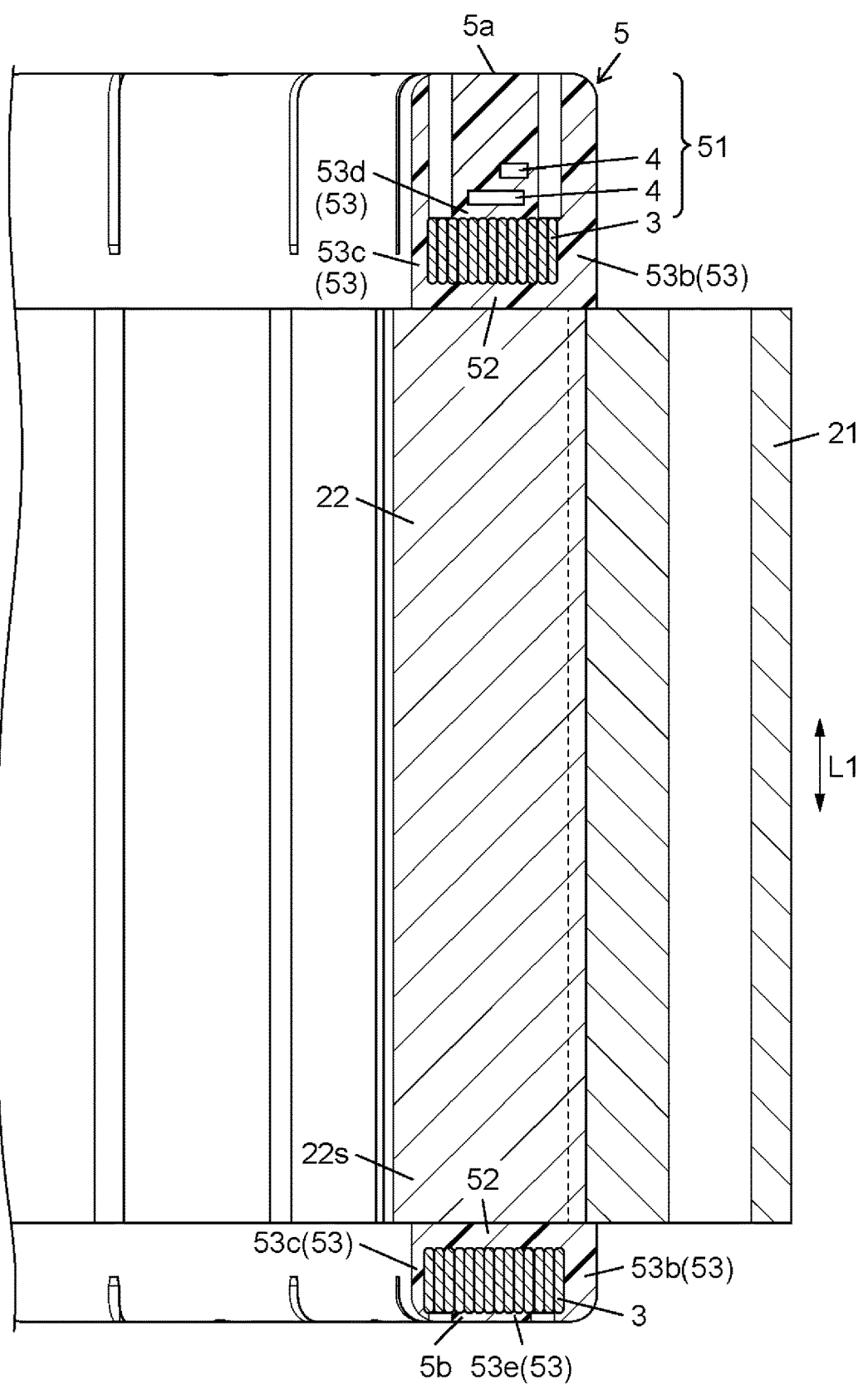
FIG. 6 is a partially enlarged view of a cross section taken along an X2-X2 line in FIG. 1.

FIG. 6 is a partially enlarged view of a cross section taken along an X2-X2 line in FIG. 1. As shown in FIGS. 1, 5, and 6, insulating resin 5 is a member for resin-molding the plurality of molded coils 3 and bus bar 4. More specifically, insulating resin 5 is a member that seals the plurality of molded coils 3 and bus bar 4 and insulates between the plurality of molded coils 3 and the plurality of teeth 22 (more specifically, between tooth 22 and molded coil 3 arranged on tooth 22). Insulating resin 5 is made of a resin having insulation properties. Insulating resin 5 is, for example, a polyphenylene sulfide (PPS) resin containing glass fiber from 30% to 50% inclusive. In particular, when PPS containing about 40% glass fiber is used as insulating resin 5, fluidity during injection of insulating resin 5 is good, and it is also preferable in terms of strength after insulating resin 5 is cured.

Alternatively, in a case where high heat resistance is not required for insulating resin 5, poly butylene terephthalate (PBT) can be used. When PBT containing glass fiber from 10% to 40% inclusive is used, it can be expected to obtain the same action and effect as PPS.

Furthermore, unsaturated polyester can also be used as insulating resin 5. In a case where unsaturated polyester is used, an appropriate amount of glass fiber may be added according to the purpose. The unsaturated polyester can also be used without adding glass fiber.

Insulating resin 5 has, for example, a cylindrical shape. Insulating resin 5 is provided on the inner peripheral surface of yoke 21. Insulating resin 5 covers the whole of the plurality of molded coils 3, a portion of bus bar 4 other than external terminals 41U, 41V, and 41W, and a portion of the plurality of teeth 22 other than distal end surface 22s. Insulating resin 5 protrudes in the direction of central axis L1 from both ends in the direction of central axis L1 of yoke 21.

More specifically, insulating resin 5 includes first resin portion 51, second resin portion 52, third resin portion 53, and fourth resin portion 54. First resin portion 51, second resin portion 52, third resin portion 53, and fourth resin portion 54 are made of the same material (for example, PPS). Note that, fourth resin portion 54 may be omitted.

First resin portion 51 is a portion that molds (that is, seals) bus bar 4 (see FIG. 6). First resin portion 51 is, for example, a portion of insulating resin 5 that is lowered by a certain distance from one end portion 5a toward other end portion 5b in the direction of central axis L1.

Second resin portion 52 is a portion that functions as an insulator (an insulating member) interposed between the plurality of teeth 22 and the plurality of molded coils 3 (see FIGS. 5 and 6). In other words, first resin portion 51 is provided on each of the plurality of teeth 22. First resin portion 51 is a portion arranged between an outer peripheral surface of tooth 22 and an inner peripheral surface of molded coil 3 arranged on tooth 22.

Third resin portion 53 is a portion that molds (that is, seals) the plurality of molded coils 3 (see FIGS. 5 and 6). In other words, third resin portion 53 is a portion that molds a portion other than the inner peripheral surface of each molded coil 3 in the plurality of molded coils 3. Third resin portion 53 includes each portion 53a to 53e of insulating resin 5. Portion 53a is a portion between adjacent molded coils 3 (see FIG. 5). Portion 53b is a portion of insulating resin 5 that covers the surface of molded coil 3 on the side of yoke 21 (see FIG. 5). Portion 53c is a portion of insulating resin 5 that covers the surface of molded coil 3 on the side opposite to the side of yoke 21 (see FIG. 5). Portion 53d is a portion between molded coil 3 and first resin portion 51 (see FIG. 6). Portion 53e is a portion between other end portion 5b of insulating resin 5 (an end surface on the side opposite to the side of bus bar 4) and molded coil 3 (see FIG. 6).

Fourth resin portion 54 is a portion that covers the base end of the three external terminals 41U, 41V, and 41W. Fourth resin portion 54 has, for example, a rectangular parallelepiped shape. Fourth resin portion 54 protrudes from an outer peripheral surface of first resin portion 51 (see FIG. 1).

First resin portion 51, second resin portion 52, third resin portion 53, and fourth resin portion 54 are integrally molded. In other words, insulating resin 5 does not include boundary surfaces that divide first resin portion 51, second resin portion 52, third resin portion 53, and fourth resin portion 54. Such integral molding can be realized, for example, by integrating core 2, the plurality of molded coils 3, bus bar 4, and insulating resin 5 by insert molding.

(2) Method for Manufacturing Stator

Figure 7:
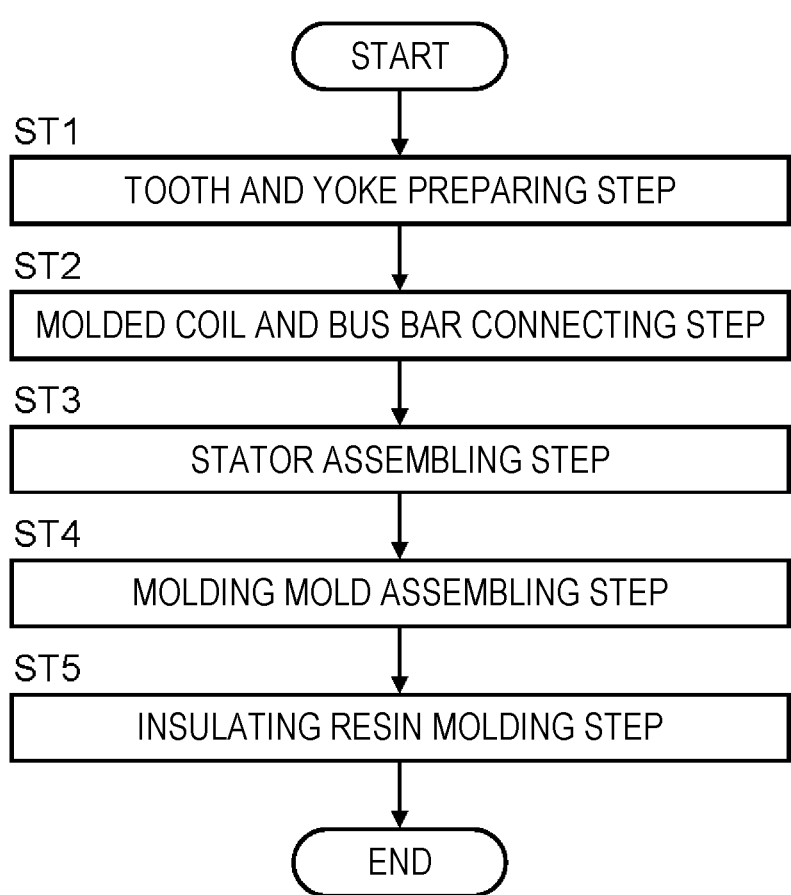
FIG. 7 is a flowchart illustrating a method of manufacturing the stator described above.

FIG. 7 is a flowchart illustrating a method of manufacturing stator 1 according to the exemplary embodiment. As shown in FIG. 7, the method for manufacturing stator 1 includes tooth and yoke preparing step ST1 (a first step), molded coil and bus bar connecting step ST2 (a second step), stator assembling step ST3 (a third step), molding mold assembling step ST4 (a fourth step), and insulating resin molding step ST5 (a fifth step).

Figure 10:
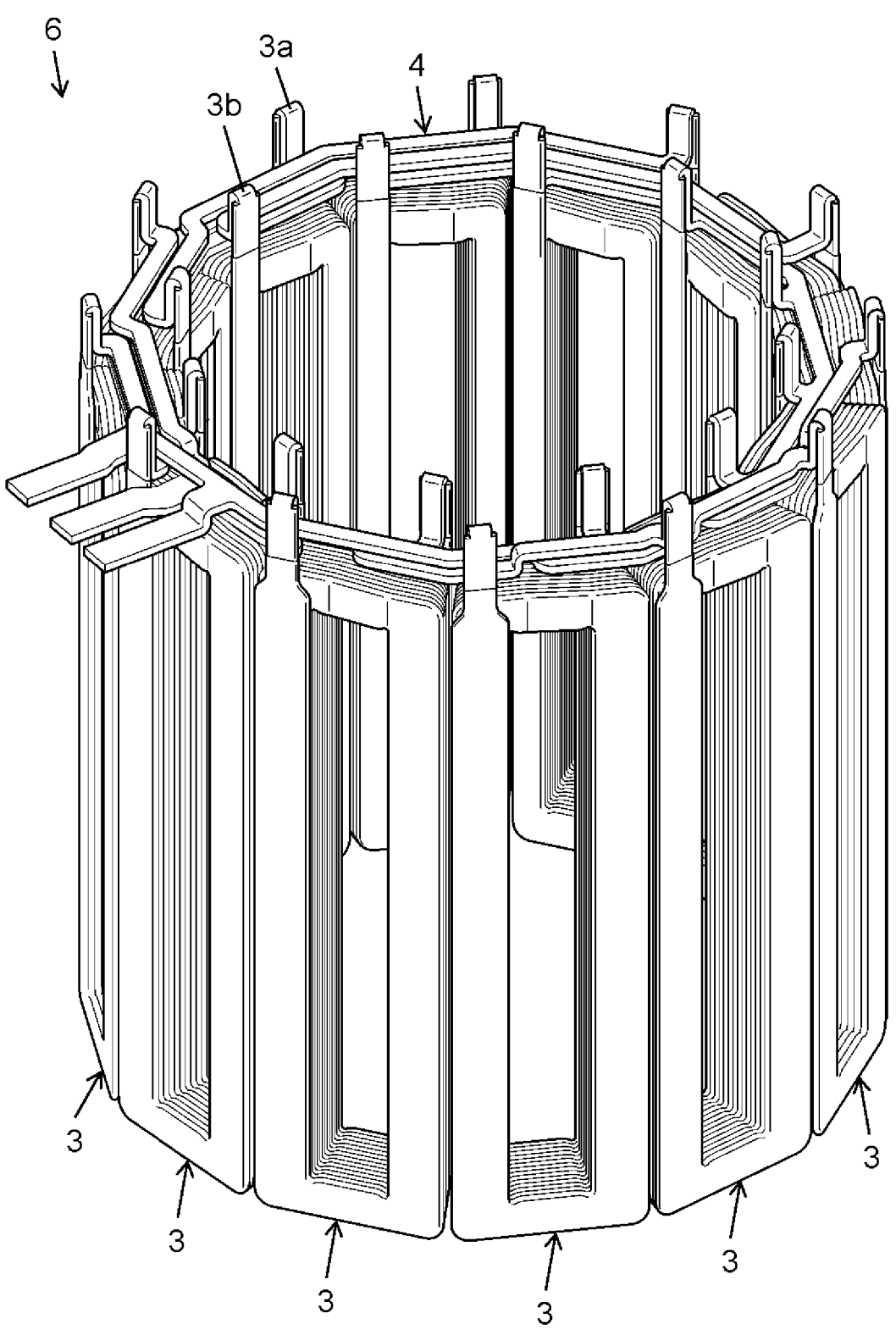
FIG. 10 is a perspective view of a connector assembled by connecting a plurality of molded coils and a bus bar.
Figure 16:
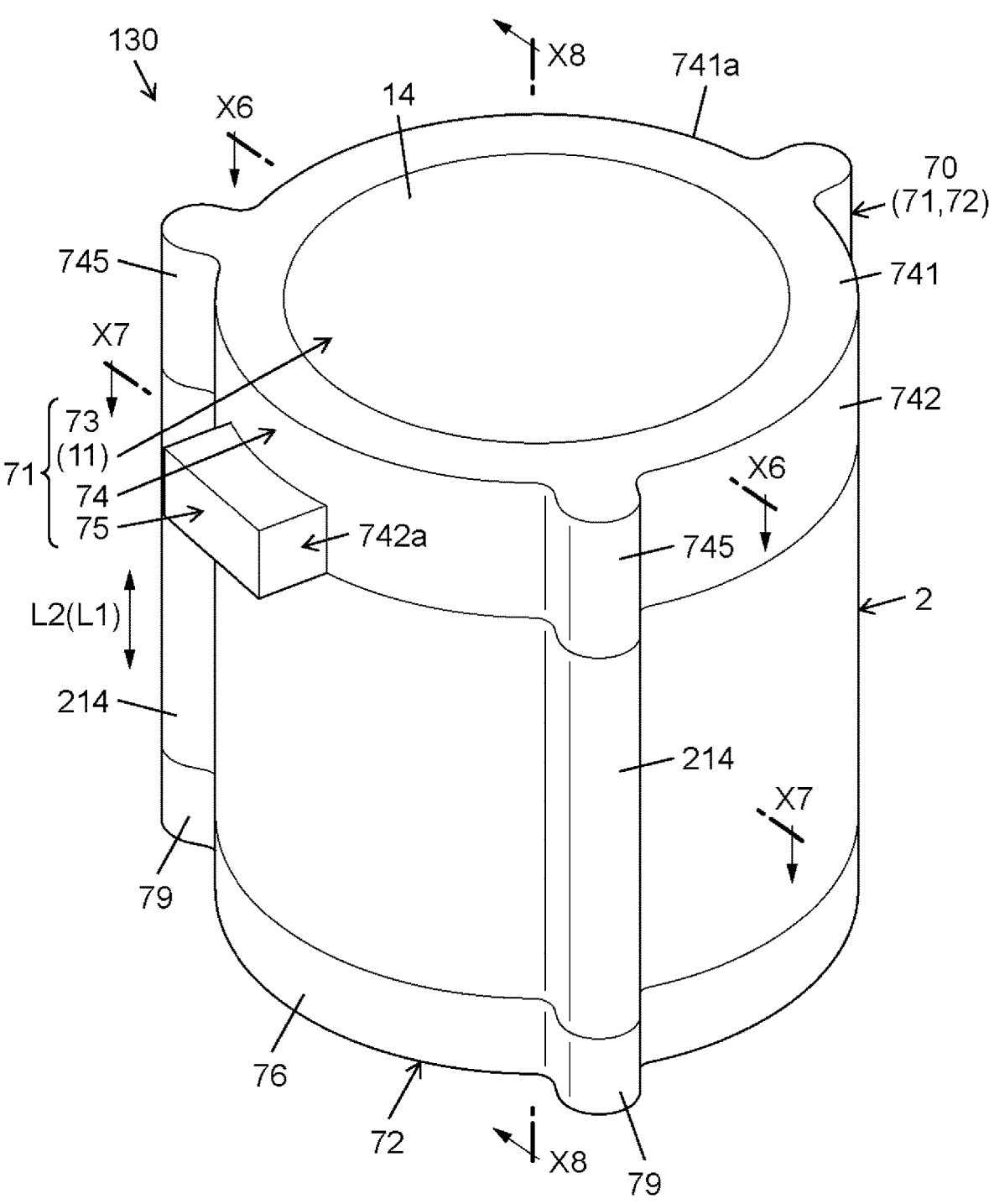
FIG. 16 is a perspective view of an assembly assembled by assembling a connector, a plurality of teeth, a yoke, a first mold, and a second mold.

Tooth and yoke preparing step ST1 is a step of preparing yoke 21 and a plurality of teeth 22 used in manufacture of stator 1. Molded coil and bus bar connecting step ST2 is a step of assembling connector 6 (see FIG. 10) by connecting a plurality of molded coils 3 used in the manufacture of stator 1 and bus bar 4. FIG. 10 is a perspective view of a connector assembled by connecting a plurality of molded coils and a bus bar. Stator assembling step ST3 is a step of assembling assembly 110 (see FIG. 11) by assembling yoke 21, the plurality of teeth 22, and connector 6 described above in a predetermined relative arrangement using jig 10 (see FIG. 11). Molding mold assembling step ST4 is a step of assembling mold assembly 130 (see FIG. 16) by assembling molding mold 70 (see FIG. 16) instead of jig 10 in assembly 110 described above. FIG. 16 is a perspective view of an assembly assembled by assembling the connector, the plurality of teeth 22, yoke 21, a first mold, and a second mold. Insulating resin molding step ST5 is a step of molding insulating resin 5 on the inner peripheral surface of yoke 21 by injecting the molten resin into mold assembly 130 and curing the molten resin. Stator 1 is completed by removing molding mold 70 after molding insulating resin 5. Hereinafter, each step ST1 to ST5 will be described in detail.

(2-1) Tooth and Yoke Preparing Step

In tooth and yoke preparing step ST1, yoke 21 and a plurality of teeth 22 constituting core 2 are prepared. Further, a plurality of molded coils 3 and bus bar 4 for constituting stator 1 are prepared.

(2-2) Molded Coil and Bus Bar Connecting Step

In molded coil and bus bar connecting step ST2, a plurality of molded coils 3 and bus bar 4 are prepared. In molded coil and bus bar connecting step ST2, the plurality of molded coils 3 and bus bar 4 are positioned and interconnected in a predetermined relative arrangement to assemble connector 6 (see FIG. 10). A predetermined relative arrangement is the same relative arrangement as the relative arrangement in stator 1.

(2-2-1) Description of Jig

Figure 8:
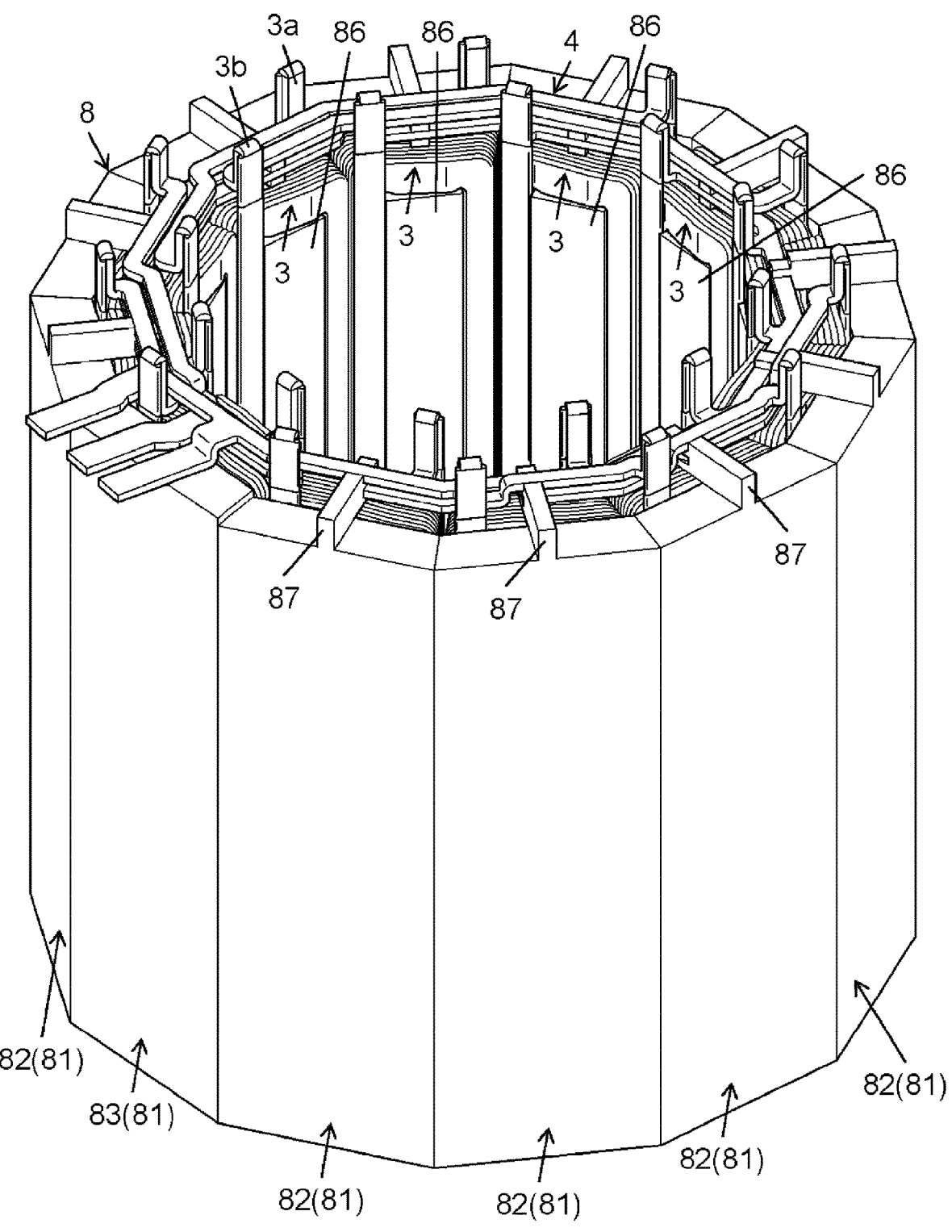
FIG. 8 is a perspective view of a state where a plurality of molded coils and a bus bar are assembled using a jig.
Figure 9A:
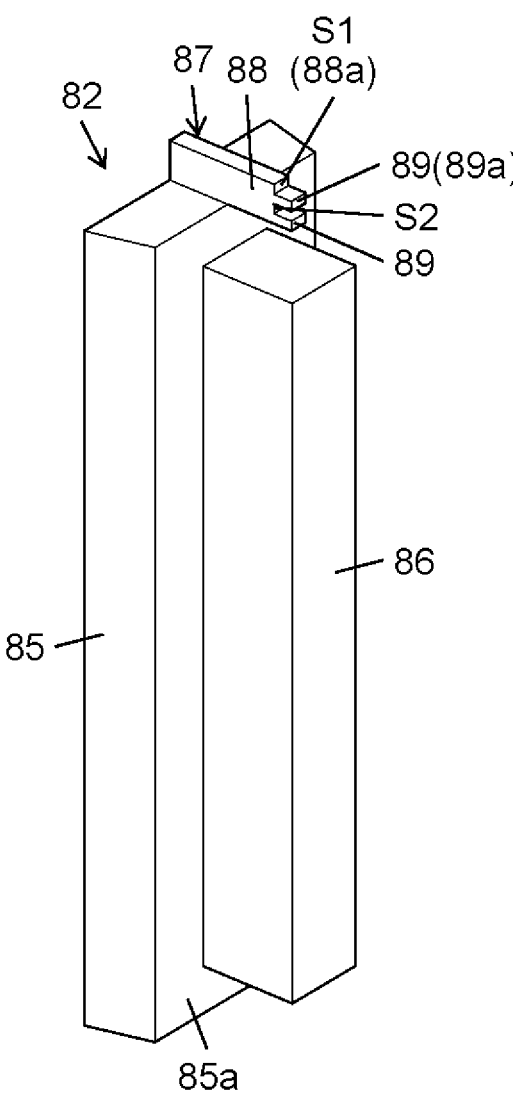
FIG. 9A is a perspective view of a first block constituting the jig of FIG. 8.
Figure 9B:
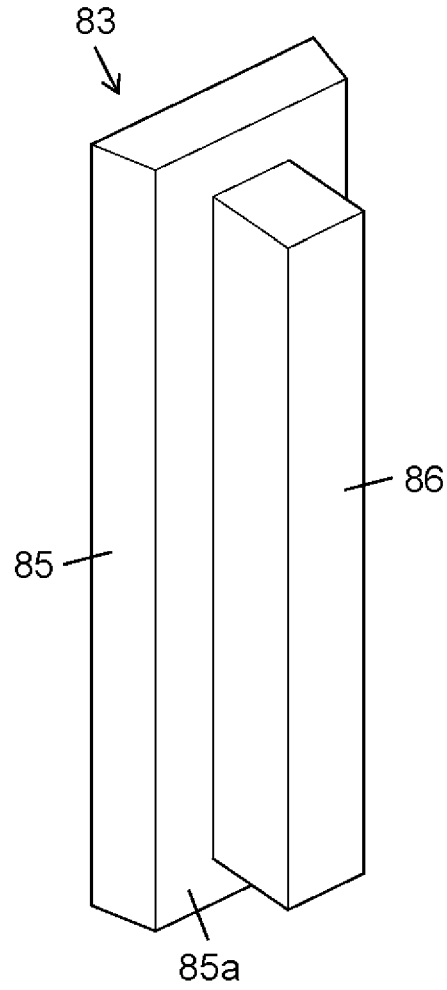
FIG. 9B is a perspective view of a second block constituting the jig of FIG. 8.

FIG. 8 is a perspective view of a state where a plurality of molded coils and a bus bar are assembled using jig 8. FIG. 9A is a perspective view of first block 82 constituting jig 8 of FIG. 8. FIG. 9B is a perspective view of second block 83 constituting jig 8 of FIG. 8. As shown in FIGS. 8, 9A, and 9B, jig 8 includes a plurality of blocks 81. The plurality of blocks 81 are made of metal, for example. The plurality of blocks 81 correspond one-to-one with the plurality of molded coils 3 and hold corresponding molded coils 3. At least one of the plurality of blocks 81 further holds a portion of bus bar 4 arranged on one end side of the corresponding molded coil 3. In other words, the at least one block 81 positions and holds the corresponding molded coil 3 and the portion of bus bar 4 arranged on the upper side (one end side) of the corresponding molded coil 3 in the predetermined relative arrangement.

The plurality of blocks 81 includes a plurality of first blocks 82 and, for example, one second block 83. First block 82 is a block having a bus bar positioning portion, and is at least one block described above. Second block 83 is a block having no bus bar positioning portion.

As shown in FIG. 9A, first block 82 includes block body 85, first positioning portion 86, and second positioning portion 87. Block body 85 is a portion that supports first positioning portion 86 and second positioning portion 87. Block body 85 has, for example, a rectangular plate shape. The cross section of block body 85 (the cross section orthogonal to the longitudinal direction of block body 85) is, for example, a trapezoid.

First positioning portion 86 is a portion (a molded coil positioning portion) that positions molded coil 3 by being inserted into the central hole of molded coil 3. First positioning portion 86 has a rectangular parallelepiped shape that can be fitted with the central hole of molded coil 3. First positioning portion 86 is provided on inner principal surface 85a (for example, the center of inner principal surface 85a) of block body 85. First positioning portion 86 protrudes from inner principal surface 85a in a normal direction of inner principal surface 85a.

Second positioning section 87 is a portion (a bus bar positioning portion) that positions bus bar 4 in a section overlapping molded coil 3 positioned by first positioning portion 86 by clamping bus bar 4 in the section. Second positioning portion 87 is provided on an upper end surface (for example, the center of the upper end surface) of block body 85. Second positioning portion 87 protrudes from the upper end surface of block body 85 in the normal direction of inner principal surface 85a of block body 85.

Second positioning portion 87 includes support portion 88 and two clamping pieces 89. Support portion 88 is a portion that supports the two clamping pieces 89. Support portion 88 is provided on the upper end surface of block body 85, and protrudes from the upper end surface of block body 85 in the normal direction of inner principal surface 85a of block body 85. The two clamping pieces 89 protrude from the distal end surface of support portion 88 in the normal direction of inner principal surface 85a of block body 85. The two clamping pieces 89 are arranged at intervals in a vertical direction on the distal end surface of support portion 88. Upper edge 88a of the distal end surface of support portion 88 protrudes upward from an upper clamping piece 89a of the two clamping pieces 89.

Between the two clamping pieces 89, bus bars 4 arranged in two rows of a lower layer of the two-layer two-row arrangement structure of bus bar 4 are arranged. In other words, the two clamping pieces 89 clamp bus bars 4 in two rows of the lower layer. On an upper surface of the upper clamping piece 89a, bus bars 4 arranged in two rows of an upper layer of the two-layer two-row arrangement structure of bus bar 4 are arranged.

The distal end surface of support portion 88 has two upper and lower contact surfaces S1 and S2. The upper contact surface S1 is constituted by upper edge 88a of the distal end surface of support portion 88. The upper contact surface S1 comes into contact with an outer side surface of the outermost bus bar 4 of bus bars 4 arranged on the upper surface of the upper clamping piece 89*a*. The lower contact surface S2 is constituted by a portion between the two clamping pieces 89 of the distal end surface of support portion 88. The lower contact surface S2 comes into contact with the outer side surface of the outermost bus bar 4 of bus bars 4 arranged between the two clamping pieces 89.

Note that, the "outermost bus bar 4" described above is bus bar 4 arranged on the outer row in a case where bus bars 4 are arranged on both the outer row and the inner row of the two-layer two-row arrangement structure and in a case where bus bar 4 is arranged only on the outer row. Further, the "outermost bus bar 4" described above is bus bar 4 arranged on the inner row in a case where bus bar 4 is arranged only on the inner row.

Note that, bus bar 4 has a plurality of sections overlapping the plurality of molded coils 3. The plurality of sections are disposed side-by-side in the circumferential direction of yoke 21. The two-layer two-row arrangement structure of bus bar 4 in each section differs according to each section. The plurality of blocks 81 correspond one-to-one with the plurality of sections. The positions of the two contact surfaces S1 and S2 of second positioning portion 87 of each first block 82 (the position of support portion 88 in the protruding direction) differ according to the two-layer two-row arrangement structure of bus bar 4 in the corresponding section.

As shown in FIG. 9B, second block 83 has a structure in which second positioning portion 87 is omitted in first block 82. In other words, second block 83 includes block body 85 and first positioning portion 86.

(2-2-2) Details of Molded Coil and Bus Bar Connecting Step

As shown in FIG. 8, first, molded coil 3 is arranged in first positioning portion 86 of each of the plurality of (for example, 12) blocks 81. In this arrangement state, both end portions 3*a* and 3*b* of molded coil 3 protrude toward the upper side of block 81.

Then, the plurality of blocks 81 are arranged in a ring shape in a predetermined arrangement order. At this time, the arrangement order of the plurality of first blocks 81 is the same as the arrangement order of the plurality of sections of bus bar 4 in stator 1 to be manufactured. In the arrangement state described above, in the plurality of blocks 81, molded coil 3 is directed inward, and adjacent blocks 81 are in contact with each other.

Then, bus bar 4 is arranged in second positioning portion 87 of each of the plurality of first blocks 82 arranged in a ring shape. At this time, in the two-layer two-row arrangement structure of bus bar 4, bus bar 4 arranged in the lower layer is arranged between the two clamping pieces 89 of second positioning portion 87. At that time, the outer side surface of the outermost bus bar 4 of bus bars 4 arranged in the lower layer comes into contact with contact surface S2 on the lower side of second positioning portion 87. In the two-layer two-row arrangement structure of bus bar 4, bus bar 4 arranged in the upper layer is arranged on the upper surface of clamping piece 89*a* on the upper side of second positioning portion 87. At that time, the outer side surface of the outermost bus bar 4 of bus bars 4 arranged in the upper layer comes into contact with contact surface S1 on the upper side of second positioning portion 87.

Bus bar 4 is positioned and arranged with relative to jig 8 by being arranged in second positioning portion 87 of the each of the plurality of first blocks 82 as described above. The plurality of molded coils 3 are positioned and arranged relative to jig 8 by being arranged in first positioning portion 86 of the each of the plurality of blocks 81. As a result, the plurality of molded coils 3 and bus bar 4 are positioned so as to have a predetermined relative arrangement (the same relative arrangement as the relative arrangement in stator 1) and are arranged on jig 8. In this arrangement state, bus bar 4 is arranged on the upper side (one end side) of the plurality of molded coils. In the arrangement state described above, both end portions 3*a* and 3*b* of the each of the plurality of molded coils 3 are arranged in contact with a predetermined portion of bus bar 4.

In this arrangement state, contact portions between both end portions 3*a* and 3*b* of the each of the plurality of molded coils 3 and bus bar 4 are connected. In this connection, for example, laser welding or spot welding is used. After the contact portions are connected, jig 8 is removed from the plurality of molded coils 3 and bus bar 4. In this way, connector 6 is assembled in which the plurality of molded coils 3 and bus bar 4 are connected in the predetermined relative arrangement (see FIG. 10). In other words, connector 6 is assembled by connecting the plurality of molded coils 3 and bus bar 4 in a state where the plurality of molded coils 3 and bus bar 4 are positioned in the predetermined relative arrangement by jig 8.

(2-3) Stator Assembling Step

Figure 11:
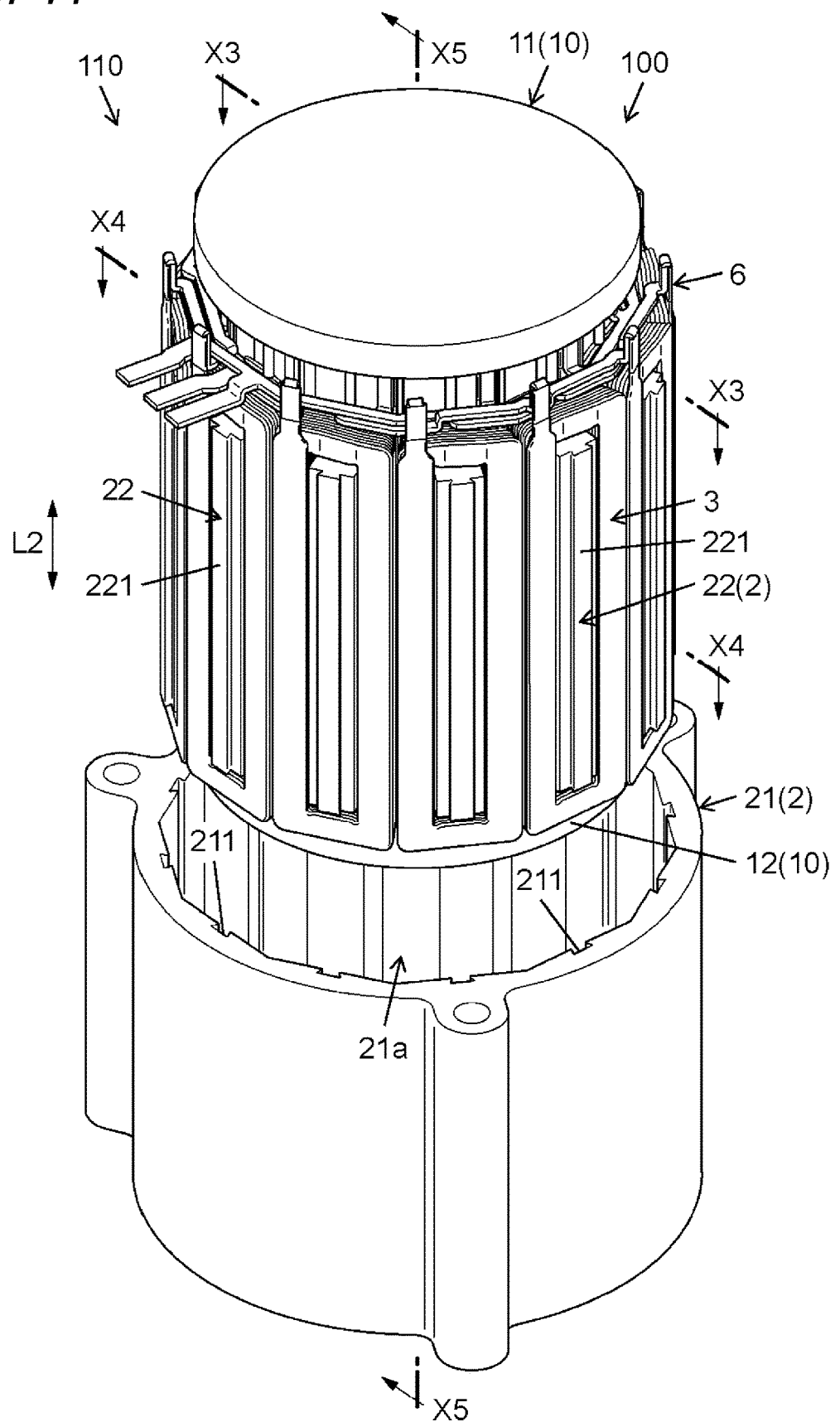
FIG. 11 is a partially exploded perspective view in which an assembly assembled by assembling a center core jig, a holding jig, a connector, a plurality of teeth, and a yoke is partially disassembled.

FIG. 11 is a partially exploded perspective view in which assembly 110 assembled by assembling the center core jig, the holding jig, connector 6, the plurality of teeth 22, and yoke 21 is partially disassembled. As shown in FIG. 11, assembly 110 is assembled in stator assembling step ST3 (the third step). Assembly 110 is assembled by inserting the plurality of teeth 22 into the plurality of molded coils 3 of connector 6, and assembling the plurality of teeth 22 to the inner peripheral surface of yoke 21 in a state where the relative arrangement between connector 6 and the plurality of teeth 22 is positioned using jig 10. In other words, assembly 110 is assembled by assembling the plurality of teeth 22 and yoke 21 prepared in tooth and yoke preparing step ST1, connector 6 assembled in molded coil and bus bar connecting step ST2, and jig 10. In other words, assembly 110 is assembled by assembling components other than insulating resin 5 (yoke 21, the plurality of teeth 22, the plurality of molded coils 3, and bus bar 4) among the components of stator 1 and jig 10. Jig 10 is used to position a relative arrangement of the plurality of molded coils 3 of connector 6 and the plurality of teeth 22.

(2-3-1) Description of Jig

Figure 12:
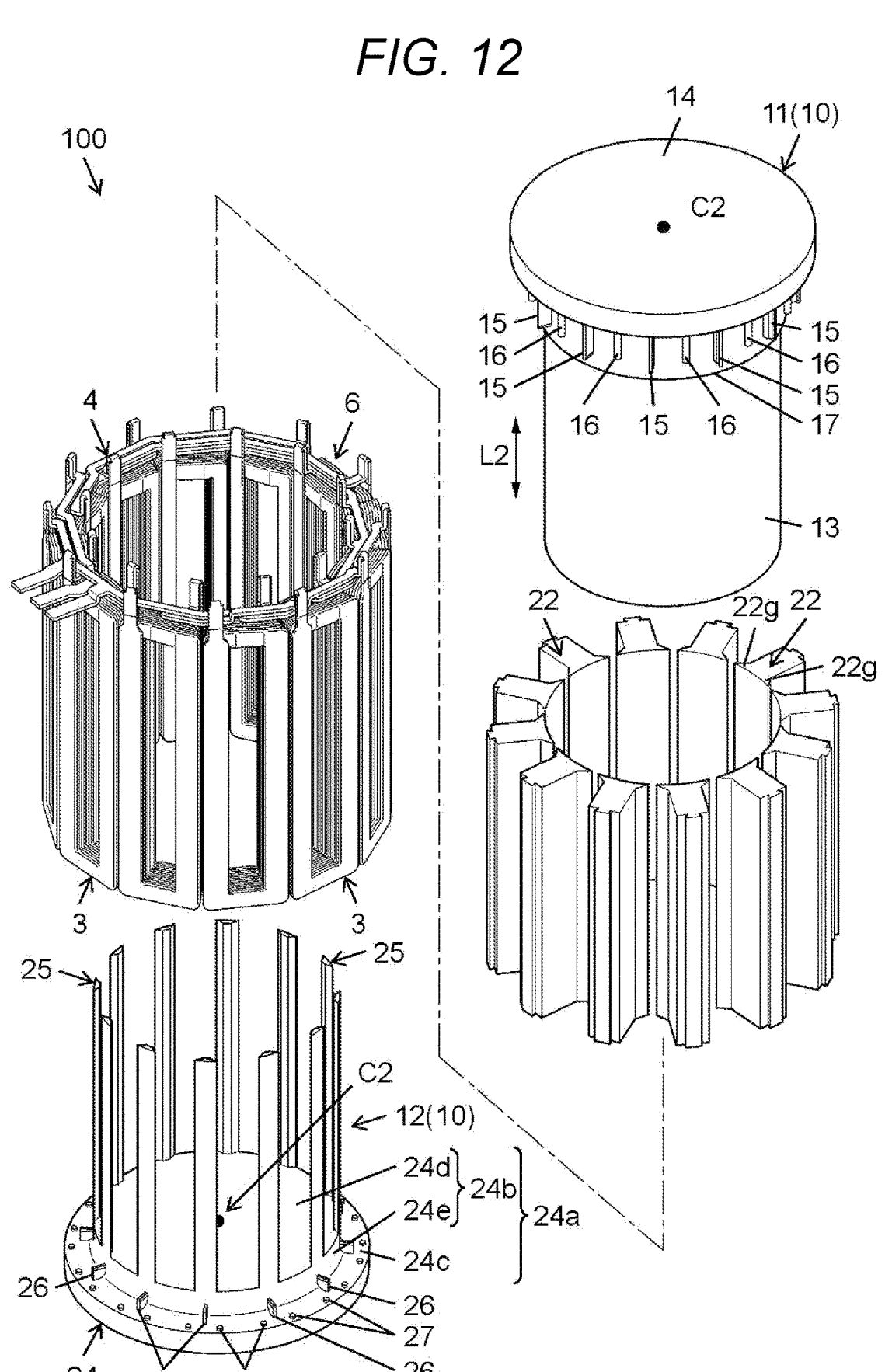
FIG. 12 is an exploded perspective view of a portion including the center core jig, the holding jig, the connector, and the plurality of teeth in the assembly of FIG. 11.

FIG. 12 is an exploded perspective view of a portion including center core jig 11, holding jig 12, connector 6, and the plurality of teeth 22 in assembly 110 of FIG. 11. As shown in FIG. 12, jig 10 includes center core jig 11 and holding jig 12. Center core jig 11 and holding jig 12 are made of metal. Center core jig 11 positions the relative position of connector 6 in the circumferential direction relative to center core jig 11. Center core jig 11 cooperates with holding jig 12 to position the relative position of connector 6 in the direction of central axis L2 relative to center core jig 11. Center core jig 11 cooperates with holding jig 12 to position the relative positions of the plurality of teeth 22 in the direction of central axis L2 relative to center core jig 11. Holding jig 12 positions the relative positions of the plurality of teeth 22 in the circumferential direction relative to holding jig 12. Central axis L2 is a central axis passing through center C2 of center core jig 11 and holding jig 12 (see FIG. 12).

(2-3-1-1) Center Core Jig

As shown in FIG. 12, center core jig 11 includes columnar portion 13, flange portion 14, a plurality of positioning ribs 15, a plurality of positioning protrusions 16, and stepped portion 17.

Columnar portion 13 is a portion arranged in the central hole of connector 6. And, columnar portion 13 is a portion arranged in a space inside the plurality of teeth 22 arranged in a ring shape.

Flange portion 14 is provided on one peripheral edge of an outer peripheral surface of columnar portion 13 in the direction of central axis L2. Flange portion 14 protrudes toward the outer peripheral side of columnar portion 13. Flange portion 14 is provided with a plurality of through holes (also referred to as gates) for pouring the molten resin. The plurality of through holes penetrate flange portion 14 in a thickness direction. The plurality of through holes are arranged at intervals along the circumferential direction of flange portion 14.

Figure 13:
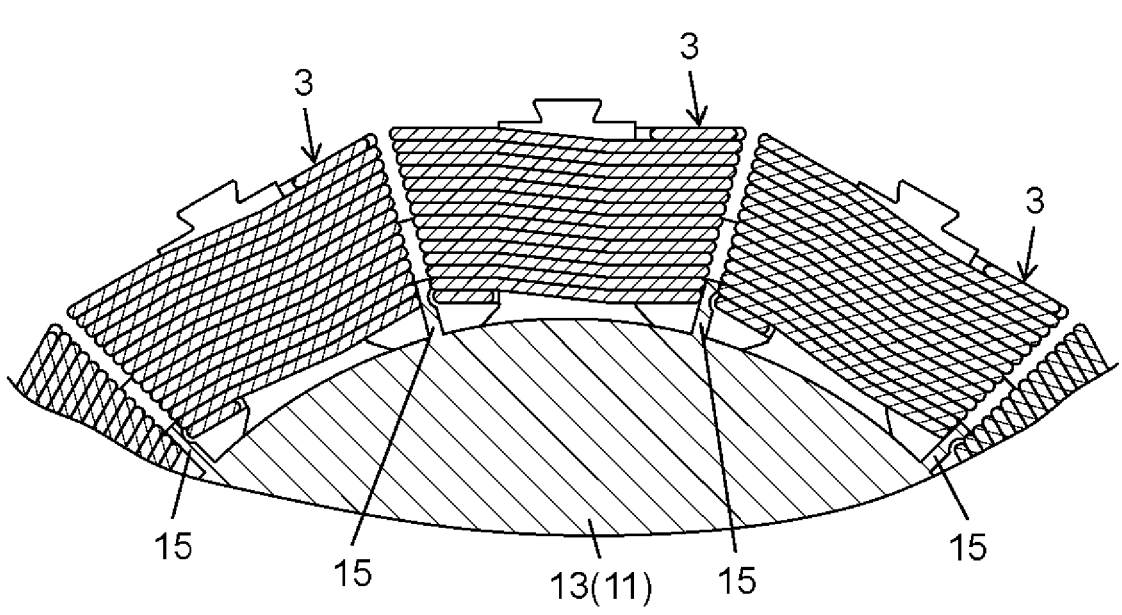
FIG. 13 is a partially enlarged view of a cross section taken along an X3-X3 line in FIG. 11.

The plurality of positioning ribs 15 position the relative positions of the plurality of molded coils 3 of connector 6 relative to center core jig 11 in the circumferential direction (This circumferential direction is the circumferential direction of yoke 21. The same applies hereinafter). The plurality of positioning ribs 15 are provided on the outer peripheral surface of columnar portion 13. The plurality of positioning ribs 15 are provided along the direction of central axis L2. The plurality of positioning ribs 15 protrude toward the outer peripheral side of columnar portion 13. Upper ends of the plurality of positioning ribs 15 are connected to a lower surface of flange portion 14. The plurality of positioning ribs 15 are arranged at equal intervals along the circumferential direction of columnar portion 13 on the outer peripheral surface of columnar portion 13. The interval between two positioning ribs 15 adjacent to each other is the same length as the width of columnar portion 13 in molded coil 3 in the circumferential direction. FIG. 13 is a partially enlarged view of a cross section taken along an X3-X3 line in FIG. 11. The plurality of molded coils 3 of connector 6 are disposed to be fitted between two positioning ribs 15 adjacent to each other on the outer peripheral surface of columnar portion 13 (see FIG. 13). As a result, the relative positions of the plurality of molded coils 3 in the circumferential direction relative to center core jig 11 are positioned.

Figure 15:
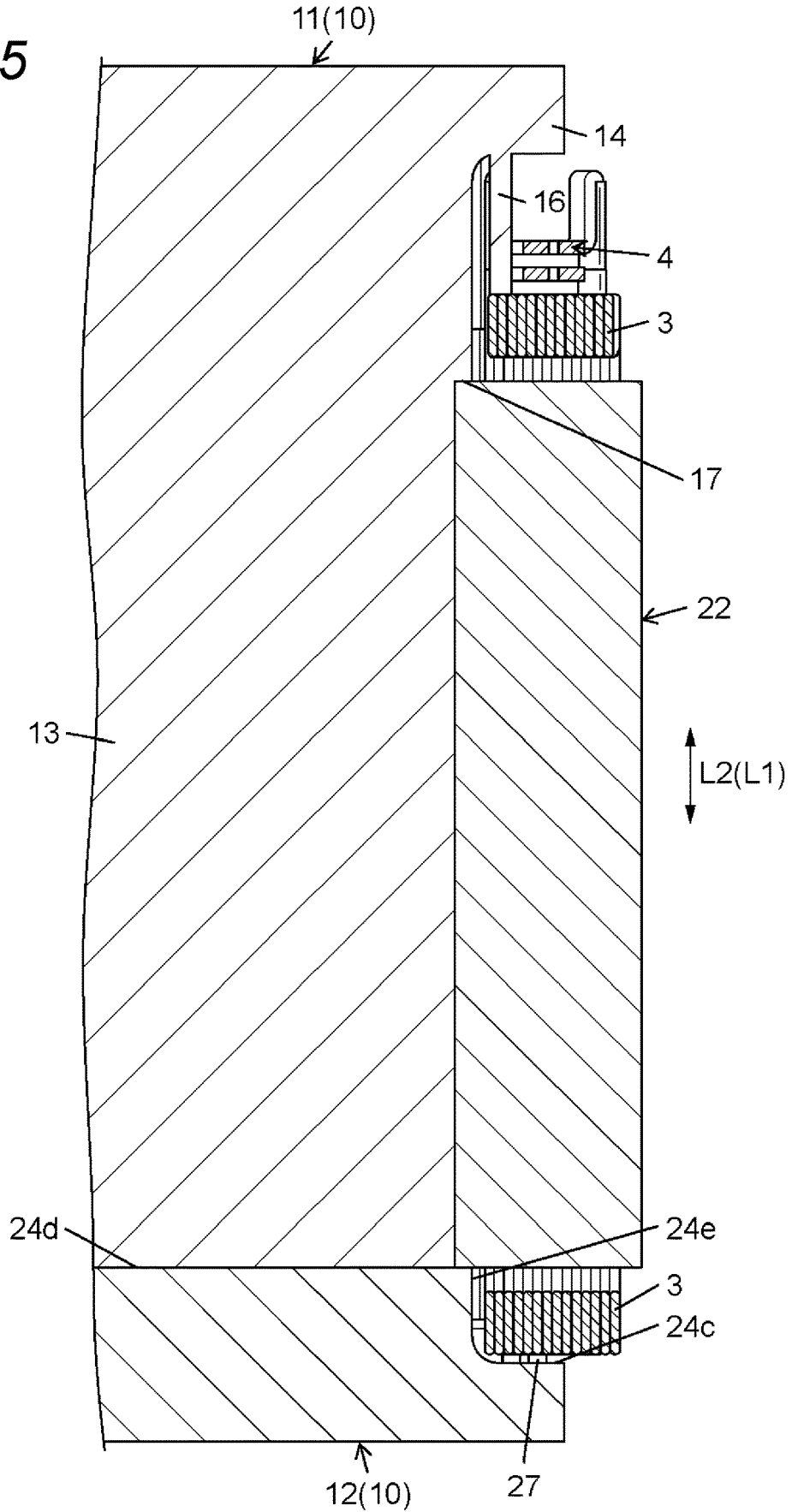
FIG. 15 is a partially enlarged view of a cross section taken along an X5-X5 line in FIG. 11.

The plurality of positioning protrusions 16 are portions that position the positions of the plurality of molded coils 3 of connector 6 in the direction of central axis L2 relative to center core jig 11. The plurality of positioning protrusions 16 protrude downward from the lower surface of flange portion 14 by a predetermined length. When a lower end of positioning protrusion 16 comes into contact with an upper end of molded coil 3, upward movement of molded coil 3 to center core jig 11 (toward the side of flange portion 14) is restricted (see FIG. 15). FIG. 15 is a partially enlarged view of a cross section taken along an X5-X5 line in FIG. 11. The plurality of positioning protrusions 16 ensure a gap in which insulating resin 5 is formed between the plurality of molded coils 3 and flange portion 14. The lower end of positioning protrusion 16 is arranged above the lower end of positioning rib 15. The plurality of positioning protrusions 16 are arranged, for example, one by one between two positioning ribs 15 adjacent to each other.

Stepped portion 17 is a portion that is caught by edges of upper surfaces of the plurality of teeth 22. When the edge of the upper surface of tooth 22 is caught by stepped portion 17, the upward movement of the plurality of teeth 22 to center core jig 11 is restricted. In stepped portion 17, on the outer peripheral surface of columnar portion 13, a region above stepped portion 17 (on the side of flange portion 14) protrudes toward the outer peripheral side of columnar portion 13 from a region below stepped portion 17. Stepped portion 17 is provided below the plurality of positioning ribs 15 on the outer peripheral surface of columnar portion 13. Stepped portion 17 is formed over the entire columnar portion 13 in the circumferential direction.

(2-3-1-2) Holding Jig

Holding jig 12 includes base plate portion 24, a plurality of fixing rods 25, a plurality of positioning ribs 26, and a plurality of positioning protrusions 27.

Base plate portion 24 has a circular plate shape. Upper surface 24a of base plate portion 24 has central portion 24b and peripheral edge portion 24c. Central portion 24b protrudes upward from peripheral edge portion 24c. Central portion 24b has central upper surface 24d and central peripheral side surface 24e. Central upper surface 24d of central portion 24b is a portion that is in contact with a lower surface of columnar portion 13 of center core jig 11. Central upper surface 24d has a circular shape in the same size as the lower surface of columnar portion 13.

The plurality of fixing rods 25 position the relative positions of the plurality of teeth 22 in the circumferential direction relative to holding jig 12. The plurality of fixing rods 25 sandwich projecting portions 22g of the plurality of teeth 22 with the outer peripheral surface of columnar portion 13 of center core jig 11. The plurality of fixing rods 25 are provided on an outer peripheral edge of central upper surface 24d of base plate portion 24. The plurality of fixing rods 25 protrude above base plate portion 24. The plurality of fixing rods 25 are arranged at equal intervals along the circumferential direction of central upper surface 24d at the outer peripheral edge of central upper surface 24d of base plate portion 24.

Figure 14:
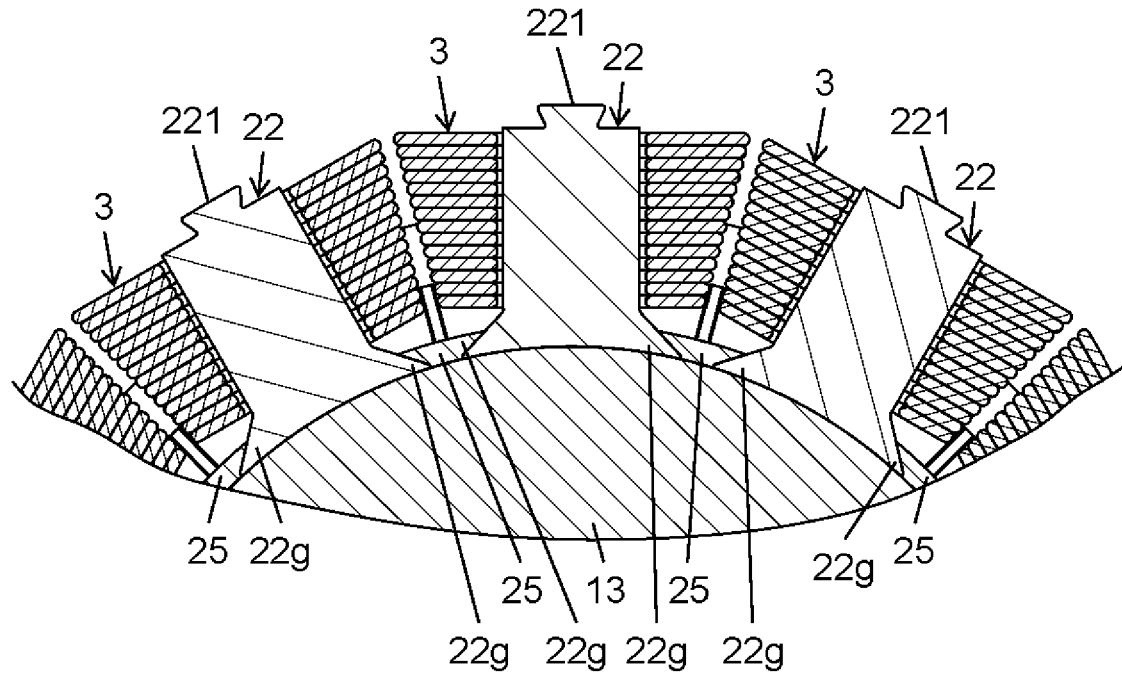
FIG. 14 is a partially enlarged view of a cross section taken along an X4-X4 line in FIG. 11.

FIG. 14 is a partially enlarged view of a cross section taken along an X4-X4 line in FIG. 11. The plurality of fixing rods 25 are arranged between adjacent teeth 22 in the plurality of teeth 22 arranged in a ring shape (see FIG. 14). Fixing rod 25 sandwiches projecting portions 22g of teeth 22 on both sides of fixing rod 25 with the outer peripheral surface of columnar portion 13 of center core jig 11.

More specifically, a cross-sectional (a cross-sectional orthogonal to central axis L2) shape of fixing rod 25 is, for example, a trapezoid. In other words, fixing rod 25 has side surfaces on both sides corresponding to oblique sides on both sides of the trapezoid and an inner surface corresponding to an upper base (a shorter base) of the trapezoid. In a state where the inner surface is in contact with the outer peripheral surface of columnar portion 13 of center core jig 11, fixing rods 25 sandwich projecting portions 22g of teeth 22 on both sides between the side surfaces on both sides and the outer peripheral surface of columnar portion 13. As a result, the plurality of teeth 22 are positioned and fixed in the circumferential direction of columnar portion 13 on the outer peripheral surface of columnar portion 13 of center core jig 11.

The plurality of positioning ribs 26 position the relative positions of the plurality of molded coils 3 of connector 6 in the circumferential direction relative to holding jig 12. The plurality of positioning ribs 26 are provided at a re-entrant angle portion between central peripheral side surface 24e and peripheral edge portion 24c of base plate portion 24 of holding jig 12. The plurality of positioning ribs 26 have a rectangular flat plate shape. The plurality of positioning ribs 26 are arranged at equal intervals in the circumferential direction of base plate portion 24. The interval between two positioning ribs 26 adjacent to each other is the same length as the width of molded coil 3. The plurality of molded coils 3 of connector 6 are arranged to be fitted between two positioning ribs 26 adjacent to each other. Accordingly, the relative positions of the plurality of molded coils 3 in the circumferential direction relative to holding jig 12 are also positioned.

The plurality of positioning protrusions 27 position the position of the each of the plurality of molded coils 3 of connector 6 in the direction of central axis L2 relative to center core jig 11. The plurality of positioning protrusions 27 protrude upward from peripheral edge portion 24c of base plate portion 24 by a predetermined length. When an upper end of positioning protrusion 27 comes into contact with a lower surface of molded coil 3, a downward movement of molded coil 3 to center core jig 11 is restricted (see FIG. 15). Two positioning protrusions 27 are provided between two positioning ribs 26 adjacent to each other in peripheral edge portion 24c of base plate portion 24. The plurality of positioning protrusions 27 ensure a gap in which insulating resin 5 is formed between the plurality of molded coils 3 and peripheral edge portion 24c of holding jig 12.

(2-3-2) Details of Stator Assembling Step

As shown in FIG. 11, in stator assembling step ST3, first, intermediate assembly 100 is assembled. Intermediate assembly 100 is assembled by assembling the plurality of teeth 22 prepared in tooth and yoke preparing step ST1, connector 6 assembled in molded coil and bus bar connecting step ST2, and jig 10 (center core jig 11 and holding jig 12).

More specifically, with reference to FIGS. 11 and 12, the plurality of teeth 22 is inserted into the central hole of the each of the plurality of molded coils 3 from the inside of connector 6. At that time, all of the plurality of teeth 22 cannot be arranged in the central hole of the each of the plurality of molded coils 3 at one time. For this reason, the plurality of teeth 22 is divided into a plurality of sets, and the plurality of the sets of teeth 22 is inserted into the central hole of molded coil 3 one by one. As described above, the plurality of teeth 22 are arranged in a ring shape on connector 6.

Then, columnar portion 13 of center core jig 11 is inserted into the central hole of connector 6 in which the plurality of teeth 22 are arranged (that is, arranged in a ring shape inside the plurality of teeth 22). At this time, columnar portion 13 of center core jig 11 is inserted into the central hole of connector 6 until stepped portion 17 of center core jig 11 comes into contact with the edges of the upper surfaces of the plurality of teeth 22. In other words, center core jig 11 is inserted into the central hole of connector 6 in a state where the plurality of teeth 22 are inserted into the plurality of molded coils 3.

In this inserted state, columnar portion 13 presses the plurality of teeth 22 from the inside to the outside of connector 6. As a result, fitting protrusion 221 on the proximal end surface of the plurality of teeth 22 protrudes from the central hole of the each of the plurality of molded coils 3 toward an outer peripheral side of connector 6. Note that, distal end surfaces 22s of the plurality of teeth 22 are in contact with the outer peripheral surface of columnar portion 13 of center core jig 11. In the above inserted state, the plurality of molded coils 3 of connector 6 are arranged between the plurality of positioning ribs 15 of center core jig 11, respectively. As a result, center core jig 11 positions the positions of the plurality of molded coils 3 in the circumferential direction relative to center core jig 11. Further, lower surfaces of the plurality of positioning protrusions 16 of center core jig 11 are in contact with the upper ends of the plurality of molded coils 3 of connector 6.

After center core jig 11 is inserted into the central hole of connector 6, holding jig 12 is assembled to a lower end side (one end side) of connector 6. In other words, holding jig 12 is assembled to one end side of connector 6 in a state where the plurality of teeth 22 are inserted into the plurality of molded coils 3. More specifically, the plurality of fixing rods 25 of holding jig 12 are inserted between the plurality of molded coils 3 of connector 6 (that is, between the plurality of teeth 22) from the lower side of connector 6 until central upper surface 24d of base plate portion 24 of holding jig 12 comes into contact with the lower surface of columnar portion 13 of center core jig 11.

In this inserted state, projecting portions 22g on both sides of each tooth 22 are sandwiched between fixing rods 25 on both sides of tooth 22 and the outer peripheral surface of columnar portion 13 of center core jig 11. As a result, the plurality of teeth 22 are fixed on the outer peripheral surface of columnar portion 13 of center core jig 11 by the plurality of fixing rods 25. The positions of the plurality of teeth 22 in the circumferential direction relative to center core jig 11 are positioned by the plurality of fixing rods 25. The plurality of molded coils 3 of connector 6 are arranged between the plurality of positioning ribs 26 of holding jig 12, respectively. As a result, holding jig 12 positions the positions of the plurality of molded coils 3 in the circumferential direction relative to center core jig 11. As a result, holding jig 12 positions the relative arrangement of the plurality of molded coils 3 and the plurality of teeth 22 in the circumferential direction of center core jig 11. The upper ends of the plurality of positioning protrusions 27 of holding jig 12 are in contact with lower ends of the plurality of molded coils 3 of connector 6.

As described above, first, intermediate assembly 100 is assembled by positioning and assembling connector 6 and the plurality of teeth 22 in a predetermined relative arrangement using center core jig 11 and holding jig 12 (see FIG. 11).

Figure 19:
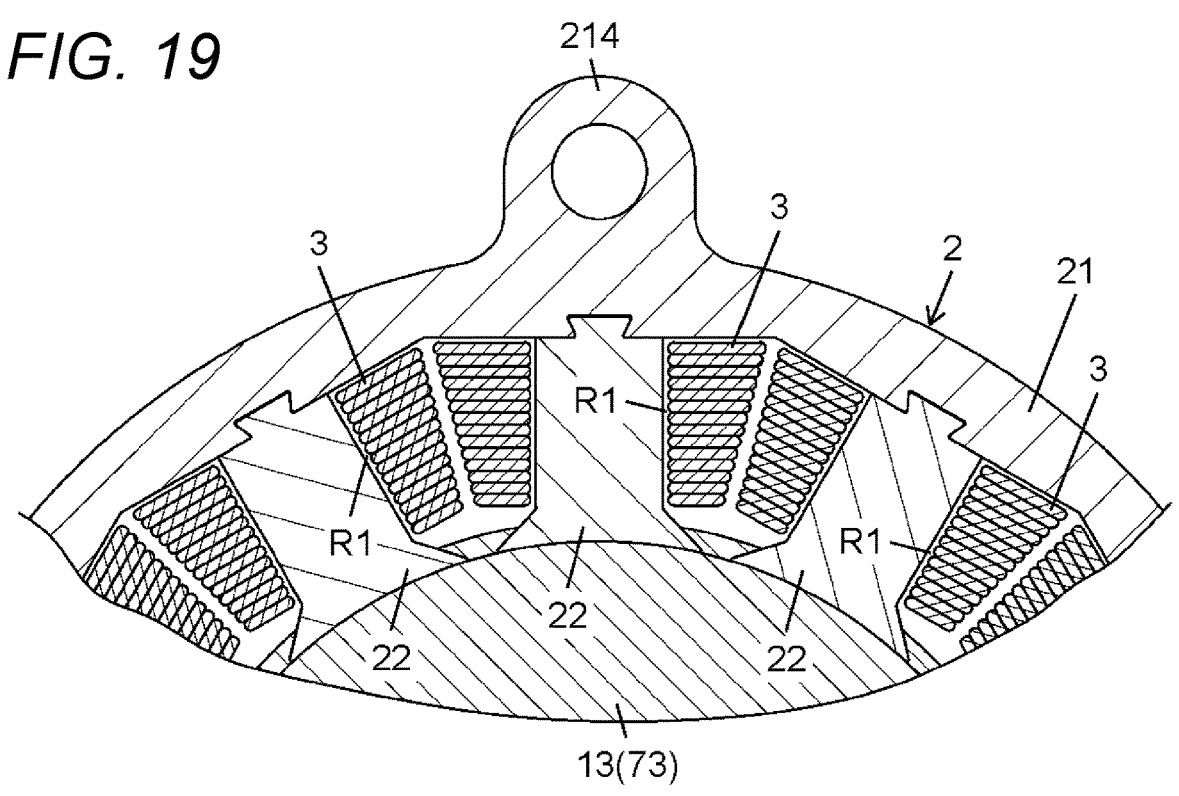
FIG. 19 is a partially enlarged view of a cross section taken along an X7-X7 line in FIG. 16.

In intermediate assembly 100, the relative positions of the plurality of molded coils 3 of connector 6 relative to center core jig 11 in the circumferential direction (this circumferential direction is the circumferential direction of yoke 21) are positioned by the plurality of positioning ribs 15 of center core jig 11 and the plurality of positioning ribs 26 of holding jig 12 (see FIG. 13). The relative positions of the plurality of molded coils 3 of connector 6 in the direction of central axis L2 relative to center core jig 11 are positioned by the plurality of positioning protrusions 16 of center core jig 11 and the plurality of positioning protrusions 27 of holding jig 12 (see FIG. 15). The relative positions of the plurality of teeth 22 in the circumferential direction relative to center core jig 11 are positioned by the plurality of fixing rods 25 of holding jig 12 (see FIG. 14). The positions of the plurality of teeth 22 in the direction of central axis L2 relative to center core jig 11 are positioned by stepped portion 17 of center core jig 11 and central upper surface 24d of holding jig 12 (see FIG. 15). As a result, the plurality of molded coils 3 and the plurality of teeth 22 are positioned in the same relative arrangement as the relative arrangement in stator 1 (the predetermined relative arrangement). In other words, gap R1 in which insulating resin 5 can be formed is secured between the plurality of teeth 22 and the plurality of molded coils 3 (that is, between each tooth 22 and molded coil 3 arranged on each tooth 22) (see FIG. 19). Bus bar 4 is arranged on one end side (the upper side) of the plurality of molded coils 3 in the direction of central axis L2 of yoke 21.

Next, this intermediate assembly 100 is inserted into central hole 21a of yoke 21 prepared in tooth and yoke preparing step ST1 (see FIG. 11). As a result, the plurality of teeth 22 of intermediate assembly 100 are assembled on the inner peripheral surface of yoke 21. In this assembled state, fitting protrusions 221 of the plurality of teeth 22 are fitted into the plurality of fitting grooves 211 on the inner peripheral surface of yoke 21. As a result, the plurality of teeth 22 are positioned and fixed on the inner peripheral surface of yoke 21. As described above, assembly 110 is assembled.

(2-4) Molding Mold Assembling Step

Figure 17:
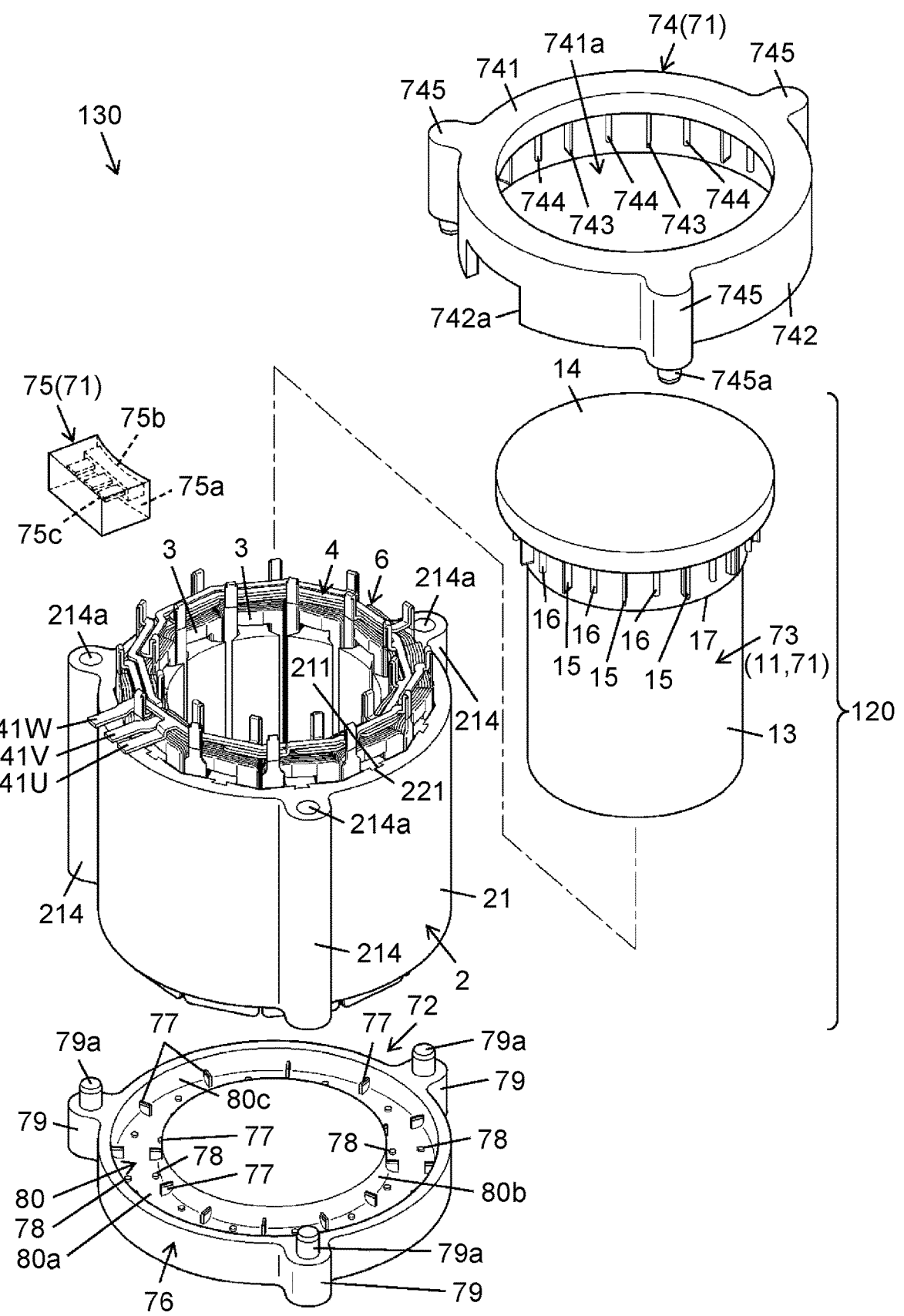
FIG. 17 is an exploded perspective view of the assembly of FIG. 16.

FIG. 17 is an exploded perspective view of the assembly of FIG. 16. As shown in FIGS. 16 and 17, mold assembly 130 is assembled in molding mold assembling step ST4. Mold assembly 130 is assembled by assembling molding mold 70 to yoke 21 instead of jig 10 in a state where the relative arrangement of the plurality of molded coils 3 and the plurality of teeth 22 is maintained in assembly 110 assembled in stator assembling step ST3 after preparing molding mold 70. Molding mold 70 includes first mold 71 and second mold 72. First mold 71 includes center core mold 73 and outer peripheral mold 74. Center core mold 73 is also used as center core jig 11.

(2-4-1) Description of Molding Mold

As shown in FIGS. 16 and 17, molding mold 70 includes first mold 71 and second mold 72.

(2-4-1-1) First Mold

As shown in FIGS. 16 and 17, first mold 71 is a mold that forms an inner peripheral surface of insulating resin 5 (see FIG. 1) to be formed, a portion of insulating resin 5 above core 2, and fourth resin portion 54 (see FIG. 1). First mold 71 is assembled to one end portion of yoke 21 in the direction of central axis L2. First mold 71 includes center core mold 73, outer peripheral mold 74, and terminal mold 75. Central axis L2 is the central axis of each of center core mold 73, outer peripheral mold 74, and second mold 72.

(2-4-1-2) Center Core Mold

Center core mold 73 is a mold that molds the inner peripheral surface of insulating resin 5 to be formed and a region of an inner peripheral side half of an upper surface of insulating resin 5. Center core mold 73 is a mold to which center core jig 11 is applied. Center core mold 73 is also used as center core mold 73 in a state where center core jig 11 assembled to connector 6 in stator assembling step ST3 is assembled. For this reason, in center core mold 73, the same components as those of center core jig 11 are denoted by the same reference numerals, and detailed descriptions thereof are omitted.

Figure 18:
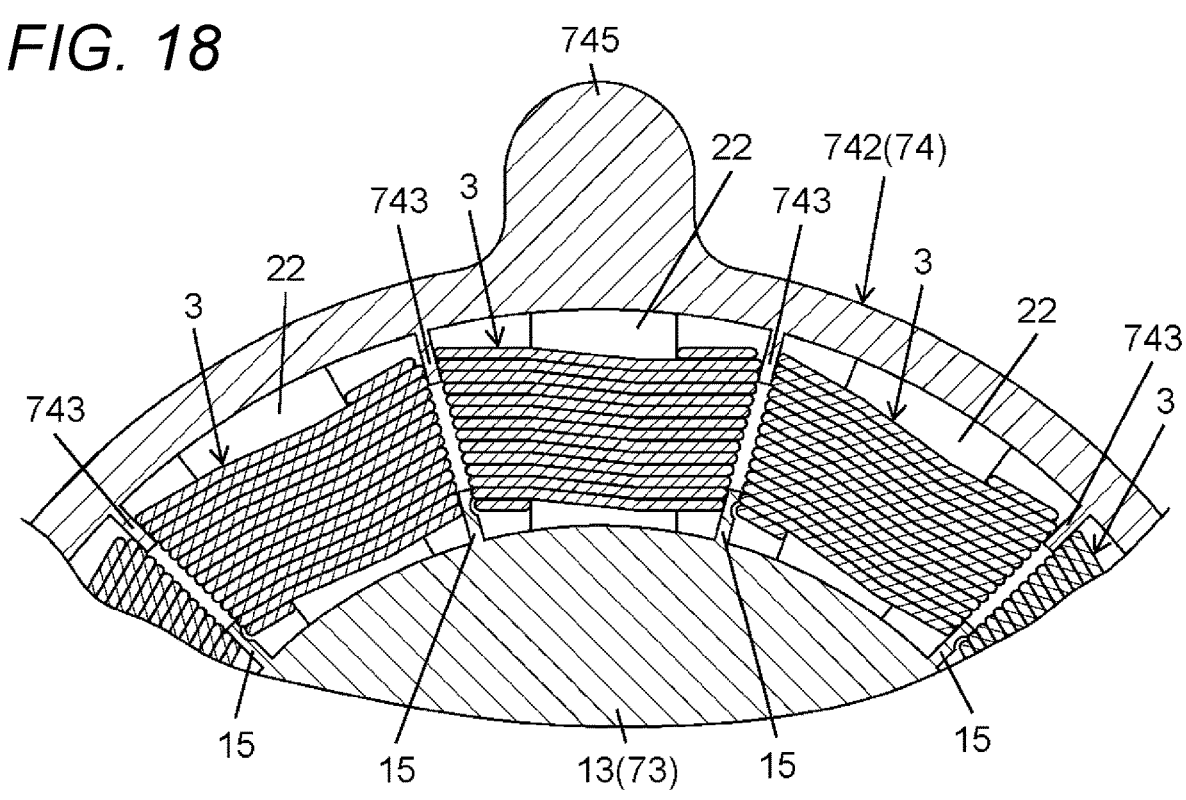
FIG. 18 is a partially enlarged view of a cross section taken along an X6-X6 line in FIG. 16.
Figure 20:
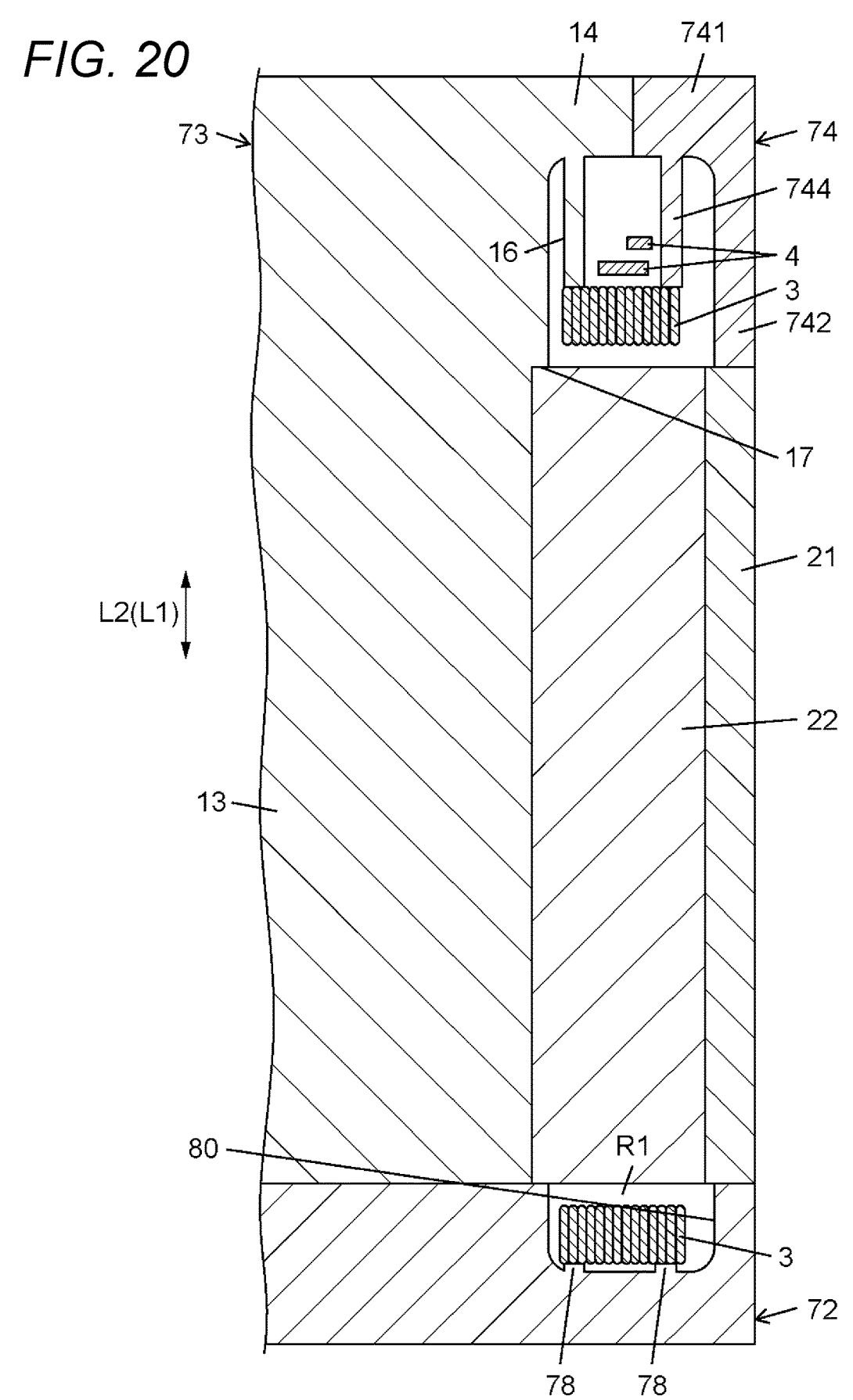
FIG. 20 is a partially enlarged view of a cross section taken along an X8-X8 line in FIG. 16.

In a state where center core mold 73 is assembled to connector 6, columnar portion 13 of center core mold 73 is inserted into the central hole of connector 6. The outer peripheral surface of columnar portion 13 is in contact with distal end surfaces 22s of the plurality of teeth 22 of connector 6. The lower ends of the plurality of positioning protrusions 16 of center core mold 73 are in contact with the upper ends of the plurality of molded coils 3 of connector 6 (see FIG. 20). FIG. 20 is a partially enlarged view of a cross section taken along an X8-X8 line in FIG. 16. The plurality of molded coils 3 of connector 6 are arranged between the plurality of positioning ribs 15 of center core mold 73, respectively (see FIG. 18). FIG. 18 is a partially enlarged view of a cross section taken along an X6-X6 line in FIG. 16.

Outer peripheral mold 74 is a mold that molds a region of an outer peripheral side half of the upper surface of insulating resin 5 to be molded and an outer peripheral surface of a portion of insulating resin 5 above core 2. Outer peripheral mold 74 includes annular plate portion 741, outer peripheral wall portion 742, a plurality of positioning ribs

743, a plurality of positioning protrusions 744, and a plurality of connection portions 745.

Through hole 741a having a circular shape is provided at the center of annular plate portion 741. Through hole 741a is a portion to which flange portion 14 of center core mold 73 is fitted.

Outer peripheral wall portion 742 has a cylindrical shape. Outer peripheral wall portion 742 is provided on an outer peripheral edge of a lower surface of annular plate portion 741. Outer peripheral wall portion 742 protrudes downward from outer peripheral wall portion 742. Outer peripheral wall portion 742 has cutout portion 742a in a rectangular shape. Cutout portion 742a is a portion where terminal mold 75 is arranged. Cutout portion 742a is provided so as to cut out a part of a lower end of outer peripheral wall portion 742 into a rectangular shape.

The plurality of positioning ribs 743 are portions for positioning the relative positions of the plurality of molded coils 3 of connector 6 in the circumferential direction relative to outer peripheral mold 74. The plurality of positioning ribs 743 are provided on an inner peripheral surface of outer peripheral wall portion 742. The plurality of positioning ribs 743 protrude from the inner peripheral surface of outer peripheral wall portion 742 to the inside of outer peripheral wall portion 742. And, the plurality of positioning ribs 743 are provided along the direction of central axis L2 of outer peripheral mold 74. An upper end of positioning rib 743 is connected to the lower surface of annular plate portion 741. The plurality of positioning ribs 743 are arranged at equal intervals in the circumferential direction of outer peripheral wall portion 742 on the inner peripheral surface of outer peripheral wall portion 742. The interval between two positioning ribs 743 adjacent to each other is the same length as the width of outer peripheral mold 74 in molded coil 3 in the circumferential direction. The plurality of molded coils 3 of connector 6 are arranged to be fitted between two positioning ribs 743 adjacent to each other in outer peripheral mold 74 (see FIG. 18). As a result, the relative positions of the plurality of molded coils 3 in the circumferential direction relative to outer peripheral mold 74 are positioned.

The plurality of positioning protrusions 744 are portions for positioning the relative positions of the plurality of molded coils 3 of connector 6 in the direction of central axis L2 relative to outer peripheral mold 74. The plurality of positioning protrusions 744 protrude downward from the lower surface of annular plate portion 741 by a predetermined length. When a lower end of positioning protrusion 744 comes into contact with the upper end of molded coil 3, the upward movement of molded coil 3 to outer peripheral mold 74 is restricted (see FIG. 20). The plurality of positioning protrusions 744 ensure a gap in which insulating resin 5 is formed between the plurality of molded coils 3 and annular plate portion 741 of outer peripheral mold 74. The lower end of positioning protrusion 744 is arranged above the lower end of positioning rib 743. The plurality of positioning protrusions 744 are arranged, for example, one by one between two positioning ribs 743 adjacent to each other on the lower surface of annular plate portion 741.

The plurality of (for example, three) connection portions 745 are portions coupled to the plurality of (for example, three) connection portions 214 of yoke 21. The plurality of connection portions 745 are substantially cylindrical. The plurality of connection portions 745 are provided along the direction of central axis L2 on an outer peripheral surface of outer peripheral wall portion 742, and are arranged at equal intervals in the circumferential direction of outer peripheral wall portion 742. A lower end of connection portion 745 is provided with fitting projection 745a that fits into fitting hole 214a on the upper surface of connection portion 214 of yoke 21. By fitting fitting projection 745a of outer peripheral mold 74 and fitting hole 214a on an upper surface of yoke 21, yoke 21 and outer peripheral mold 74 are positioned and connected to each other in the circumferential direction of yoke 21.

Outer peripheral mold 74 is assembled to an opening on the upper surface of yoke 21 (that is, the side opposite to the side of second mold 72) of connector 6. In this assembled state, flange portion 14 of center core mold 73 is fitted into through hole 741a of outer peripheral mold 74. A lower end surface of outer peripheral wall portion 742 of outer peripheral mold 74 is in contact with an upper end surface of yoke 21 of connector 6. Fitting projections 745a of the plurality of connection portions 745 of outer peripheral mold 74 are fitted into fitting holes 214a on the upper surfaces of the plurality of connection portions 214 of yoke 21. The lower ends of the plurality of positioning protrusions 744 of outer peripheral mold 74 are in contact with the upper ends of the plurality of molded coils 3 of connector 6 (see FIG. 20). The plurality of molded coils 3 of connector 6 are arranged between the plurality of positioning ribs 743 of outer peripheral mold 74, respectively (see FIG. 18). The distal end portions of three external terminals 41U, 41V, and 41W of bus bar 4 of connector 6 protrude from cutout portion 742a of outer peripheral mold 74 to the outside of outer peripheral mold 74.

(2-4-1-3) Terminal Mold

Terminal mold 75 is a mold that forms fourth resin portion 54. Terminal mold 75 is fitted into cutout portion 742a of outer peripheral mold 74. Terminal mold 75 has a rectangular parallelepiped shape that is long in a lateral direction. One side surface 75a of terminal mold 75 is curved in a concave shape along the longitudinal direction of one side surface 75a. One side surface 75a of terminal mold 75 is provided with molding recess 75b. An inner surface of molding recess 75b molds an outer peripheral surface of fourth resin portion 54. A bottom surface (that is, an inner surface facing one side surface 75a) of molding recess 75b is provided with three holes 75c into which the respective distal end portions of three external terminals 41U, 41V, and 41W of connector 6 are inserted.

This terminal mold 75 is attached to cutout portion 742a of outer peripheral wall portion 742 of outer peripheral mold 74. In this attached state, the side of one side surface 75a of terminal mold 75 is fitted into cutout portion 742a. Terminal mold 75 protrudes toward the outer peripheral side from outer peripheral wall portion 742 of outer peripheral mold 74. The distal end portions of three external terminals 41U, 41V, and 41W of connector 6 are inserted into three holes 75c of terminal mold 75.

(2-4-1-4) Second Mold

As shown in FIGS. 16 and 17, second mold 72 forms a portion of insulating resin 5 (see FIG. 1) to be formed below core 2. Second mold 72 is assembled to an opening on one end side (the side opposite to the side of first mold 71) in the direction of central axis L2 of yoke 21 instead of holding jig 12. Second mold 72 has, for example, a circular plate shape. Second mold 72 includes base plate portion 76, a plurality of positioning ribs 77, a plurality of positioning protrusions 78, and a plurality of connection portions 79.

Base plate portion 76 has, for example, a circular plate shape. Annular groove 80 is provided on an upper surface of base plate portion 76. Annular groove 80 is formed in an annular shape along an outer peripheral edge of the upper surface of base plate portion 76.

The plurality of positioning ribs 77 are portions for positioning the relative positions of the plurality of molded coils 3 of connector 6 in the circumferential direction relative to second mold 72. The plurality of positioning ribs 77 are provided at a re-entrant angle portion between bottom surface 80a and inner peripheral surface 80b and a re-entrant angle portion between bottom surface 80a and outer peripheral surface 80c in annular groove 80. The plurality of positioning ribs 77 have a rectangular flat plate shape. The plurality of positioning ribs 77 are arranged at equal intervals in the circumferential direction of base plate portion 76. The interval between two positioning ribs 26 adjacent to each other in the circumferential direction of base plate portion 76 is the same length as the width of molded coil 3. The plurality of molded coils 3 of connector 6 are arranged to be fitted between two positioning ribs 77 adjacent to each other in the circumferential direction of base plate portion 76. As a result, the relative positions of the plurality of molded coils 3 in the circumferential direction relative to second mold 72 are positioned.

The plurality of positioning protrusions 78 are portions for positioning the positions of the plurality of molded coils 3 of connector 6 in the direction of central axis L2 relative to second mold 72. The plurality of positioning protrusions 78 protrude upward from the bottom surface of annular groove 80 by a predetermined length. When an upper end of positioning protrusion 78 comes into contact with the lower end of molded coil 3, the downward movement of the plurality of molded coils 3 to second mold 72 is restricted (see FIG. 20). The plurality of positioning protrusions 78 ensure a gap in which insulating resin 5 is formed between the plurality of molded coils 3 and second mold 72. For example, two positioning protrusions 78 are arranged between two positioning ribs 77 adjacent to each other at an inner peripheral edge and an outer peripheral edge of annular groove 80.

The plurality of (for example, three) connection portions 79 are portions coupled to the plurality of (for example, three) connection portions 214 of yoke 21. The plurality of connection portions 79 are substantially cylindrical. The plurality of connection portions 79 are provided along the direction of central axis L2 on an outer peripheral surface of base plate portion 76. And, the plurality of connection portions 79 are arranged at equal intervals in the circumferential direction on the outer peripheral surface of base plate portion 76. An upper end of connection portion 79 is provided with fitting projection 79a that fits into fitting hole 214a of connection portion 214 of yoke 21. By fitting fitting projection 79a of second mold 72 and fitting hole 214a of yoke 21, second mold 72 and yoke 21 are positioned and connected to each other in the circumferential direction of yoke 21.

Second mold 72 is assembled to an opening of assembly 110 on the lower end side (the side opposite to the side of outer peripheral mold 74) of yoke 21. In this assembled state, the central portion of an upper surface of second mold 72 is in contact with a lower end surface of columnar portion 13 of center core mold 73. The outer peripheral edge is in contact with a lower end surface of yoke 21 of connector 6. Fitting projections 79a of the plurality of connection portions 79 of second mold 72 are fitted into fitting holes 214a on the lower surfaces of the plurality of connection portions 214 of yoke 21. The upper ends of the plurality of positioning protrusions 78 of second mold 72 are in contact with the lower ends of the plurality of molded coils 3 of connector 6.

The plurality of molded coils 3 of connector 6 are arranged between the plurality of positioning ribs 77 of second mold 72.

(2-4-2) Description of Assembly State of Mold Assembly 130

As described above, mold assembly 130 is assembled.

In mold assembly 130, fitting hole 214*a* at the upper end of yoke 21 and fitting projection 745*a* of outer peripheral mold 74 are fitted. Fitting hole 214*a* at the lower end of yoke 21 and fitting projection 79*a* of second mold 72 are fitted. As a result, the relative positions of outer peripheral mold 74 and second mold 72 in the circumferential direction relative to yoke 21 are positioned. The relative positions of the plurality of molded coils 3 in the circumferential direction relative to yoke 21 are positioned by the plurality of positioning ribs 743 of outer peripheral mold 74 and the plurality of positioning ribs 77 of second mold 72. The plurality of teeth 22 are positioned and fixed to yoke 21. The relative positions of the plurality of molded coils 3 in the direction of central axis L2 relative to yoke 21 are positioned by the plurality of positioning protrusions 744 of outer peripheral mold 74 and the plurality of positioning protrusions 78 of second mold 72. From these, the relative arrangement of the plurality of teeth 22 and the plurality of molded coils 3 is positioned, and gap R1 for forming second resin portion 52 of insulating resin 5 is secured between each tooth 22 and molded coil 3 arranged on each tooth 22 (see FIGS. 19 and 20). The dimensions of the outer diameter and the inner diameter of molded coil 3 are accurately formed by using molded coil 3. As a result, gap R1 is secured more accurately. Bus bar 4 is arranged above (adjacent to) the plurality of molded coils 3 in the direction of central axis L2 of yoke 21.

(2-5) Insulating Resin Molding Step

In insulating resin molding step (ST5), the molten resin, which is the molten state of insulating resin 5, is poured into an internal space (that is, a space surrounded by yoke 21, the plurality of teeth 22, and molding mold 70) of the mold assembly 130 assembled in molding mold assembling step (ST4) through the through hole (the gate) provided in first mold 71. At this time, as described above, gap R1 is secured between the plurality of teeth 22 and the plurality of molded coils 3. Therefore, the poured molten resin spreads over gap R1 between the plurality of teeth 22 and the plurality of molded coils 3 to form second resin portion 52 of insulating resin 5. Further, the poured molten resin molds bus bar 4 to form first resin portion 51 of insulating resin 5. The poured molten resin molds the each of the plurality of molded coils 3 to form third resin portion 53. Then, the poured molten resin is cured to form insulating resin 5 on the inner peripheral surface of yoke 21. After the poured molten resin is cured, stator 1 is completed by removing molding mold 70 (first mold 71 and second mold 72) from yoke 21.

(3) Major Effects

As described above, stator 1 according to the present exemplary embodiment includes core 2, a plurality of molded coils 3, bus bar 4, and insulating resin 5. Core 2 includes yoke 21 having a tubular shape and a plurality of teeth 22 that protrude from an inner peripheral surface of yoke 21 to the inside of yoke 21. The plurality of molded coils 3 are arranged on the plurality of teeth 22. Bus bar 4 is connected to the plurality of molded coils 3 and can be connected to an external circuit. Insulating resin 5 has insulation properties. Insulating resin 5 includes first resin portion 51, second resin portion 52, and third resin portion 53. First resin portion 51 molds bus bar 4. Second resin portion 52 is arranged between the plurality of teeth 22 and the plurality of molded coils 3. Third resin portion 53 molds the plurality of molded coils 3. First resin portion 51, second resin portion 52, and third resin portion 53 are integrally molded.

According to this configuration, first resin portion 51, second resin portion 52, and third resin portion 53 are integrally formed. For this reason, first resin portion 51, second resin portion 52, and third resin portion 53 can be formed by forming a resin mold once. As a result, an increase in cost can be suppressed. Further, since first resin portion 51 and third resin portion 53 are integrally formed, the reliability of the connection part between molded coil 3 and bus bar 4 against external vibration can be improved.

Further, as described above, the stator manufacturing method according to the present exemplary embodiment includes tooth and yoke preparing step ST1 (the first step), molded coil and bus bar connecting step ST2 (the second step), stator assembling step ST3 (the third step), molding mold assembling step ST4 (the fourth step), and insulating resin molding step ST5 (the fifth step). In tooth and yoke preparing step ST1, yoke 21 having a tubular shape and the plurality of teeth 22 to be assembled to the inner peripheral surface of yoke 21 are prepared. In molded coil and bus bar connecting step ST2, the plurality of molded coils 3 and bus bar 4 are prepared, and the plurality of molded coils 3 and bus bar 4 are positioned and interconnected in a predetermined relative arrangement to assemble connector 6. In stator assembling step ST3, the plurality of teeth 22 are inserted into the plurality of molded coils 3 of connector 6, and in a state where the relative arrangement between connector 6 and the plurality of teeth 22 is positioned using jig 10, the plurality of teeth 22 are assembled to the inner peripheral surface of yoke 21 to assemble assembly 110. In molding mold assembling step ST4, molding mold 70 is prepared, and mold assembly 130 in which molding mold 70 is assembled to yoke 21 instead of jig 10 is assembled in a state where the relative arrangement of the plurality of molded coils 3 and the plurality of teeth 22 is maintained in assembly 110. In insulating resin molding step ST5, in mold assembly 130, the molten resin is poured into the internal space surrounded by yoke 21, the plurality of teeth 22, and molding mold 70, and after the molten resin is cured, molding mold 70 is removed from yoke 21. In molding mold assembling step ST4 (the fourth step), the plurality of teeth 22 are assembled to the inner peripheral surface of yoke 21 and protrude from the inner peripheral surface of yoke 21. The plurality of molded coils 3 are arranged on the plurality of teeth 22. Bus bar 4 is arranged on one end side of the plurality of molded coils 3 in the direction of central axis L2 of yoke 21. First mold 71 and second mold 72 are assembled to yoke 21 so as to block the openings on both sides of yoke 21. First mold 71 and second mold 72 secure gap R1 into which the molten resin flows between the plurality of molded coils 3 and the plurality of teeth 22 by positioning the relative positions of the plurality of molded coils 3 in the circumferential direction and the relative positions of the plurality of molded coils 3 in the direction of central axis L2 relative to yoke 21.

According to this configuration, first mold 71 and second mold 72 position the relative positions of the plurality of molded coils 3 in the circumferential direction and the relative positions of the plurality of molded coils 3 in the direction of central axis L2 relative to yoke 21. As a result, gap R1 into which the molten resin flows is secured between the plurality of molded coils 3 and the plurality of teeth 22. For this reason, when the molten resin is poured into the internal space surrounded by yoke 21, the plurality of teeth 22, first mold 71, and second mold 72, the poured molten resin also flows into gap R1 between the plurality of teeth 22 and the plurality of molded coils 3. As a result, the resin portion (first resin portion 51) that molds bus bar 4, the resin portion (third resin portion 53) that molds the plurality of molded coils 3, and the resin portion (second resin portion 52) arranged between the plurality of molded coils 3 and the plurality of teeth 22 can be integrally formed by the poured molten resin. In other words, first resin portion 51, second resin portion 52, and third resin portion 53 can be formed by forming the resin mold once. As a result, an increase in manufacturing cost can be suppressed. Further, since first resin portion 51 and third resin portion 53 are integrally formed, the reliability of the connection part between molded coil 3 and bus bar 4 against external vibration can be improved.

(4) Aspects

The present disclosure can take the following aspects from the above exemplary embodiments and modifications.

Stator (1) of a first aspect includes core (2), a plurality of molded coils (3), bus bar (4), and insulating resin (5). Core (2) includes yoke (21) having a tubular shape and a plurality of teeth (22). The plurality of teeth (22) protrude from an inner peripheral surface of yoke (21) to the inside of yoke (21). The plurality of molded coils (3) are arranged on the plurality of teeth (22). Bus bar (4) is electrically connected to the plurality of molded coils (3) and can be electrically connected to an external circuit. Insulating resin (5) has insulation properties. Insulating resin (5) includes first resin portion (51), second resin portion (52), and third resin portion (53). First resin portion (51) molds bus bar (4). Second resin portion (52) is arranged between the plurality of teeth (22) and the plurality of molded coils (3). Third resin portion (53) molds the plurality of molded coils (3). First resin portion (51), second resin portion (52), and third resin portion (53) are integrally molded.

According to this configuration, first resin portion (51), second resin portion (52), and third resin portion (53) are integrally formed. For this reason, first resin portion (51), second resin portion (52), and third resin portion (53) can be formed by molding the resin mold once. As a result, an increase in manufacturing cost can be suppressed. Further, since first resin portion (51) and third resin portion (53) are integrally formed, the reliability of the connection part between molded coil (3) and bus bar (4) against external vibration can be improved.

In stator (1) of a second aspect according to the first aspect, first resin portion (51), second resin portion (52), and third resin portion (53) are made of the same resin material.

According to this configuration, first resin portion (51), second resin portion (52), and third resin portion (53) can be formed in one manufacturing process. As a result, an increase in manufacturing cost can be suppressed.

In stator (1) of a third aspect according to the first or second aspect, insulating resin (5) does not include boundary surfaces that divide first resin portion (51), second resin portion (52), and third resin portion (53).

According to this configuration, first resin portion (51), second resin portion (52), and third resin portion (53) can be integrally formed.

In stator (1) of a fourth aspect according to any one of the first to third aspects, core (2), the plurality of molded coils (3), bus bar (4), and insulating resin (5) are integrated by insert molding.

According to this configuration, first resin portion (51), second resin portion (52), and third resin portion (53) can be integrally formed.

A stator manufacturing method according to a fifth aspect includes first step (ST1), second step (ST2), third step (ST3), fourth step (ST4), and fifth step (ST5). In first step (ST1), yoke (21) having a tubular shape and a plurality of teeth (22) to be assembled to an inner peripheral surface of yoke (21) are prepared. In second step (ST2), the plurality of molded coils (3) and bus bar (4) are prepared, and the plurality of molded coils (3) and bus bar (4) are positioned and interconnected in a predetermined relative arrangement to assemble connector (6). In third step (ST3), the plurality of teeth (22) are inserted into the plurality of molded coils (3) of connector (6). Then, the plurality of teeth (22) are assembled to the inner peripheral surface of yoke (21) to assemble assembly (110) in a state where a relative arrangement of connector (6) and the plurality of teeth (22) is positioned using jig (10). In fourth step (ST4), molding mold (70) is prepared, and in assembly (110), mold assembly (130) is assembled by assembling molding mold (70) to yoke (21) instead of jig (10) in a state where a relative arrangement of the plurality of molded coils (3) and the plurality of teeth (22) is maintained. In fifth step (ST5), in mold assembly (130), molten resin is poured into an internal space surrounded by yoke (21), the plurality of teeth (22), and molding mold (70), and after the molten resin is cured, molding mold (70) is removed from yoke (21). In fourth step (ST4), the plurality of teeth (22) are assembled to the inner peripheral surface of yoke (21) and protrude from the inner peripheral surface of yoke (21). The plurality of molded coils (3) are arranged on the plurality of teeth (22). Bus bar (4) is arranged on one end side of the plurality of molded coils (3) in the direction of central axis (L2) of yoke (21). First mold (71) and second mold (72) are assembled to yoke (21) so as to block the openings on both sides of yoke (21). First mold (71) and second mold (72) secure gap (K1) into which the molten resin flows between the plurality of molded coils (3) and the plurality of teeth (22) by positioning the relative positions of the plurality of molded coils (3) in the circumferential direction and the relative positions of the plurality of molded coils (3) in the direction of central axis (L2) relative to yoke (21).

According to this configuration, first mold (71) and second mold (72) position the relative positions of the plurality of molded coils (3) in the circumferential direction and the relative positions of the plurality of molded coils (3) in the direction of central axis (L2) relative to yoke (21). As a result, gap (R1) into which the molten resin flows is secured between the plurality of molded coils (3) and the plurality of teeth (22). For this reason, when the molten resin is poured into the internal space surrounded by yoke (21), the plurality of teeth (22), first mold (71), and second mold (72), the poured molten resin also flows into gap (R1) between the plurality of teeth (22) and the plurality of molded coils (3). As a result, the resin portion (first resin portion (51)) that molds bus bar (4), the resin portion (third resin portion (53)) that molds the plurality of molded coils (3), and the resin portion (second resin portion (52)) arranged between the plurality of molded coils (3) and the plurality of teeth (22) can be integrally formed by the poured molten resin. In other words, first resin portion (51), second resin portion (52), and third resin portion (53) can be formed by forming the resin mold once. As a result, an increase in manufacturing cost can be suppressed. Further, since first resin portion (51) and third resin portion (53) are integrally formed, the reliability of the connection part between molded coil (3) and bus bar (4) against external vibration can be improved.

In a stator manufacturing method of a sixth aspect according to the fifth aspect, in second step (ST2), a plurality of blocks (81) that correspond to the plurality of molded coils (3) and hold the corresponding molded coils (3) are prepared. At least one (first block 82) of the plurality of blocks (81) further holds a portion of bus bar (4) arranged on one end side of the corresponding molded coil (3). Connector (6) is assembled by connecting the plurality of molded coils (3) and bus bar (4) in a state where the plurality of molded coils (3) and bus bar (4) are positioned in a predetermined relative arrangement by the plurality of blocks (81).

According to this configuration, by using the plurality of blocks (81), the relative arrangement of the plurality of molded coils (3) and bus bar (4) can be accurately positioned, and connector (6) can be assembled.

In a stator manufacturing method of a seventh aspect according to the fifth or sixth aspect, in third step (ST3), jig (10) includes center core jig (11) and holding jig (12). Center core jig (11) is inserted into the central hole of connector (6) in a state where the plurality of teeth (22) are inserted into the plurality of molded coils (3), and positions positions of the plurality of molded coils (3) in the circumferential direction relative to center core jig (11). Holding jig (12) is assembled to one end side of connector (6) in a state where the plurality of teeth (22) are inserted into the plurality of molded coils (3), and positions the relative arrangement of the plurality of molded coils (3) and the plurality of teeth (22) in the circumferential direction of center core jig (11).

Intermediate assembly (100) is assembled by positioning and assembling connector (6) and the plurality of teeth (22) in a predetermined relative arrangement using center core jig (11) and holding jig (12). Then, by inserting intermediate assembly (100) into the central hole of yoke (21), the plurality of molded coils (3) of intermediate assembly (100) are assembled to the inner peripheral surface of yoke (21) to assemble assembly (110).

According to this configuration, by using center core jig (11) and holding jig (12), the plurality of teeth (22) can be assembled to the inner peripheral surface of yoke (21) in a state where the relative arrangement of the plurality of molded coils (3) and the plurality of teeth (22) is accurately positioned.

In a stator manufacturing method of an eighth aspect according to the seventh aspect, in fourth step (ST4), molding mold (70) includes first mold (71) and second mold (72), and first mold (71) includes center core jig (11) and outer peripheral mold (74).

In assembly (110), instead of holding jig (12), second mold (72) is assembled to the opening on one end side of yoke (21), and outer peripheral mold (74) is assembled to an opening on the side opposite to the side of second mold (72)

in yoke (21). Second mold (72) and outer peripheral mold (74) position the relative positions of the plurality of molded coils (3) in the circumferential direction relative to yoke (21), and position the relative positions of the plurality of molded coils (3) in the direction of central axis (L2) relative to yoke (21), respectively.

According to this configuration, first metal mold (71) and second mold (72) can be assembled to yoke (21) while maintaining an assembly accuracy of intermediate assembly (100).

The invention claimed is:

1. A stator comprising:
a core including a yoke having a tubular shape and a plurality of teeth that protrude from an inner peripheral surface of the yoke to inside of the yoke;
a plurality of molded coils arranged on the plurality of teeth;
a bus bar electrically connected to the plurality of molded coils and electrically connected to an external circuit; and
an insulating resin having insulation properties, wherein the insulating resin includes:
a first resin portion that molds the bus bar;
a second resin portion that is arranged between the plurality of teeth and the plurality of molded coils; and
a third resin portion that molds the plurality of molded coils,
the first resin portion, the second resin portion, and the third resin portion are made of same resin material,
the insulating resin does not include boundary surfaces that divide the first resin portion, the second resin portion, and the third resin portion, and
the first resin portion, the second resin portion, and the third resin portion are integrally molded.

2. The stator according to claim 1, wherein the core, the plurality of molded coils, the bus bar, and the insulating resin are integrated by insert molding.

3. The stator according to claim 1, wherein the molded coil is a coil in which each winding portion is laminated while winding conductor having an elongated plate shape.

4. The stator according to claim 1, wherein the third resin portion is provided between adjacent molded coils.

5. The stator according to claim 1, wherein:
a plurality of slits are provided to the insulating resin, and
each of the plurality of slits reaches a corresponding one of the plurality of molded coils.

* * * * *